United States Patent
Boyer

(10) Patent No.: US 9,552,410 B2
(45) Date of Patent: Jan. 24, 2017

(54) DOCUMENT ORDER MANAGEMENT VIA RELAXED NODE INDEXING

(71) Applicant: International Business Machines Corporation, Armonk, NY (US)

(72) Inventor: John M. Boyer, Victoria (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 323 days.

(21) Appl. No.: 14/193,544

(22) Filed: Feb. 28, 2014

(65) Prior Publication Data

US 2014/0330835 A1 Nov. 6, 2014

(30) Foreign Application Priority Data

May 6, 2013 (CA) ..................................... 2815156

(51) Int. Cl.
*G06F 17/30* (2006.01)
*G06F 17/27* (2006.01)

(52) U.S. Cl.
CPC ..... *G06F 17/30613* (2013.01); *G06F 17/2705* (2013.01); *G06F 17/30067* (2013.01); *G06F 17/30321* (2013.01); *G06F 17/30864* (2013.01); *G06F 17/30961* (2013.01)

(58) Field of Classification Search
CPC ................... G06F 17/30864; G06F 17/30321; G06F 17/30613; G06F 17/30961; G06F 17/30067
USPC ....................................................... 707/741
See application file for complete search history.

(56) References Cited

U.S. PATENT DOCUMENTS

| | | | |
|---|---|---|---|
| 6,826,726 B2 | 11/2004 | Hsing et al. | |
| 6,938,204 B1 | 8/2005 | Hind et al. | |
| 8,112,704 B2 | 2/2012 | Clarke et al. | |
| 2002/0023113 A1* | 2/2002 | Hsing | G06F 17/30578 715/234 |
| 2002/0143742 A1* | 10/2002 | Nonomura | G06F 17/30923 |
| 2002/0147711 A1* | 10/2002 | Hattori | G06F 17/30938 |
| 2003/0037031 A1* | 2/2003 | Birder | G06F 17/3092 |
| 2003/0110150 A1* | 6/2003 | O'Neil | G06F 17/30917 |
| 2004/0002952 A1 | 1/2004 | Lee et al. | |
| 2005/0203957 A1 | 9/2005 | Wang et al. | |
| 2006/0005122 A1* | 1/2006 | Lemoine | G06F 17/30938 715/234 |
| 2007/0156750 A1 | 7/2007 | Calahan | |
| 2007/0271305 A1* | 11/2007 | Chandrasekar | G06F 17/30917 |
| 2009/0019067 A1* | 1/2009 | Furusho | G06F 17/30327 707/101 |
| 2009/0106286 A1 | 4/2009 | Chakraborty et al. | |

(Continued)

OTHER PUBLICATIONS

IBM, "Ordered and Optimized DOM Initialization," IP.com No. IPCOM000013688D, Publication Date: Sep. 1, 2001, 3 pages.

*Primary Examiner* — Pierre Vital
*Assistant Examiner* — Andrew N Ho
(74) *Attorney, Agent, or Firm* — Cantor Colburn LLP

(57) ABSTRACT

An illustrative embodiment includes processing parse tree data. A parse tree data structure that is representative of a document object model (DOM) tree data structure is received. Concomitant to receiving the parse tree data structure, an assignment of index values for the DOM nodes consisting of distinct index values for each existing DOM node is received by the processor. Requests to manipulate the parse tree data structure that include node inserts and document order comparisons are also performed.

16 Claims, 10 Drawing Sheets

(56) References Cited

U.S. PATENT DOCUMENTS

| | | | |
|---|---|---|---|
| 2010/0017700 A1* | 1/2010 | Odean | G06F 17/241 715/230 |
| 2010/0169354 A1* | 7/2010 | Baby | G06F 17/30911 707/765 |
| 2011/0106811 A1* | 5/2011 | Novoselsky | G06F 17/30911 707/741 |
| 2011/0252310 A1* | 10/2011 | Rahaman | G06F 17/2211 715/255 |
| 2011/0302198 A1* | 12/2011 | Baby | G06F 17/30539 707/769 |
| 2012/0330984 A1* | 12/2012 | Fablet | G06F 17/2247 707/755 |

* cited by examiner

100

DOCUMENT ORDER MANAGEMENT VIA RELAXED NODE INDEXING

PRIORITY

This application claims priority to Canadian Patent Application No. 2,815,156, filed May 6, 2013, and all the benefits accruing therefrom under 35 U.S.C. §119, the contents of which in its entirety are herein incorporated by reference.

BACKGROUND

This disclosure relates generally to information and data management in a data processing system and, more specifically, to manipulating a parse tree structure and efficiently performing node order comparisons within the parse tree in support of a tree order enforcing expression language.

Data formats such as extensible markup language (XML) or JavaScript® Object Notation (JSON) are typically syntactically parsed into a general tree data structure containing a logical node for each pertinent syntactic component of the data. Regardless of the data format, this parse tree data structure is referred to as a document object model (DOM). Each node of a DOM typically contains information about the syntactic component being represented, such as an XML element tag name or content value, as well as index or pointer values that bind the DOM node into the tree structure, including an indicator of the parent, preceding sibling and next sibling, a child list, and possibly a separate attribute list. The document order of a DOM corresponds to a visitation order of DOM nodes resulting from a depth first traversal of the DOM tree. A depth first traversal, also known as a pre-order traversal, is a traversal of a tree structure in which a node is deemed visited or processed before any of its child nodes are visited or processed.

Creating a DOM for data enables querying or mutation of the data using an application programming interface (API) interface to the DOM. A tree addressing scheme is used to indicate a particular node or a set of nodes in the DOM. For example, an XML path language, XPath (a query language for selecting nodes from an XML document) expression can be used to obtain an XML node or set of nodes, and a dotted JavaScript notation expression can be used to obtain a JSON object. Typically, during the execution of either expression and production of a respective result, the referenced nodes are navigated in an organized manner relative to the DOM structure. For example, each XPath location step produces a set of nodes, in document order, before proceeding to a next location step. A key factor in placing nodes in document order is a DOM node comparator that determines which of two given DOM nodes is earlier in document order.

Once a DOM node (or set of nodes) is obtained, both informational and structural mutations can then be performed using the API, including changing tag names or content values (informational mutation) or performing insert and delete operations on a DOM node or nodes (structural mutation, or structural manipulation of the parse tree data structure).

Given two distinct DOM tree nodes of node $D_X$ and node $D_Y$, the DOM tree traversal comparison method first traverses the parent links of node $D_X$ and node $D_Y$ to find the closest common ancestor node A (in this example). If one of node $D_X$ and node $D_Y$ is the ancestor node A, then the node equivalent to node A is the earlier node in document order. Otherwise, the children node $C_X$ and node $C_Y$ of the closest common ancestor A are obtained; where node $C_X$ is the root node of the DOM sub-tree containing node $D_X$, and node $C_Y$ is the root node of the DOM sub-tree containing node $D_Y$. When node $C_X$ is earlier in the child list of node A, then node $D_X$ is the earlier node in document order, and otherwise node $D_Y$ is the earlier node in document order.

An advantage of the DOM tree traversal comparison method is that the method places no encumbrance on insert and delete operations, which normally have an O(1) cost for structural manipulations of the DOM. However a disadvantage of the method is the comparison can require O(n) time, where n is the traversal length of the tree path (node $D_X$, ... node $C_X$, ..., node $C_Y$, ... node $D_Y$) that excludes node A. The comparison operation most typically becomes expensive in a DOM due to node A having a large number of children, for example, there is an O(n) distance between node $C_X$ and node $C_Y$.

To mitigate this disadvantage, a common practice is use of a node index method. The node index method performs a depth first search operation to associate a depth-first index (DFI), with each DOM node. The node index method has an O(N) cost, where N is the number of DOM nodes visited and indexed, but the advantage is that once the indexing operation is performed, all subsequent comparison operations have a very fast O(1) cost to compare the DFIs of the node $D_X$ and node $D_Y$, where the node with the lesser DFI is determined to be the earlier node. The disadvantage is that this efficiency only lasts until a next insert operation occurs, which alters the DOM structure. Since the newly inserted node or nodes do not have an associated DFI value, a common practice is to mark the whole node index map as stale and revert to using the DOM tree traversal comparison method.

To mitigate this problem, a depth first search after each mutation sequence (for example, script) can be used to re-index the nodes, which clear a stale flag and restore a previously efficient node comparison operation. However, mutation scripts containing few structural mutations in relation to a number of informational mutations tend to run faster by re-indexing after each insert operation. On the other hand, re-indexing after each insert operation places an O(N) worst case cost on each insert operation, so mutation scripts containing many structural manipulations of the parse tree data structure tend to run much slower due to re-indexing after each insert operation.

In a further proposed solution, a 2010 paper in the Journal of Information and Data Management: *DeweyIDs—The Key to Fine-Grained Management of XML Documents*, focuses optimization of XML document storage and retrieval in XML databases. The DeweyID proposal is derived from the Dewey decimal system of organizing library books. The DeweyID is a single key comprised of a variable number of integer index values that help achieve efficient B*-tree operations relative to prior XML database systems. While appropriate for XML databases and B*-tree operations, the DeweyID proposal is not appropriate for implementing efficient node comparison and structural mutation of an in-memory DOM.

SUMMARY

Embodiments include a method, computer program product and apparatus for processing parse tree data. The method includes receiving a parse tree data structure, wherein the parse tree data structure is representative of a document object model (DOM) tree data structure. Concomitant to receiving the parse tree data structure, an assignment of index values for the DOM nodes consisting of distinct index values for each existing DOM node is received by the processor. In addition, a request to manipulate the parse tree data structure is received, the request includes an insert DOM node request for a new DOM node. Concomitant to receiving the request requesting to manipulate the parse tree data structure, an indication of a parse tree insert location for the new DOM node to be inserted is received. Responsive to receiving the indication of the parse tree insert location: a distinguishable index value to the new DOM node to be inserted is assigned, and the new DOM node is inserted at the indicated parse tree insert location. A document order comparison request to determine an earlier of a first given DOM node and a second given DOM node is received by the processor. Based on receiving the document order comparison request, it is determined whether the document order comparison request can be satisfied by a comparison of the index values of the first given DOM node and the second given DOM node. Based on determining that the document order comparison request can be satisfied by a comparison of the index values of the first given DOM node and the second given DOM node, selecting as the earlier DOM node one of the first given DOM node and the second DOM node based on the comparison of the index values of the first given DOM node and the second given DOM node. Based on determining that the document order comparison request cannot be satisfied by the comparison of the index values of the first given DOM node and the second given DOM node, selecting as the earlier DOM node one of the first given DOM node and the second DOM node using a secondary comparison method.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
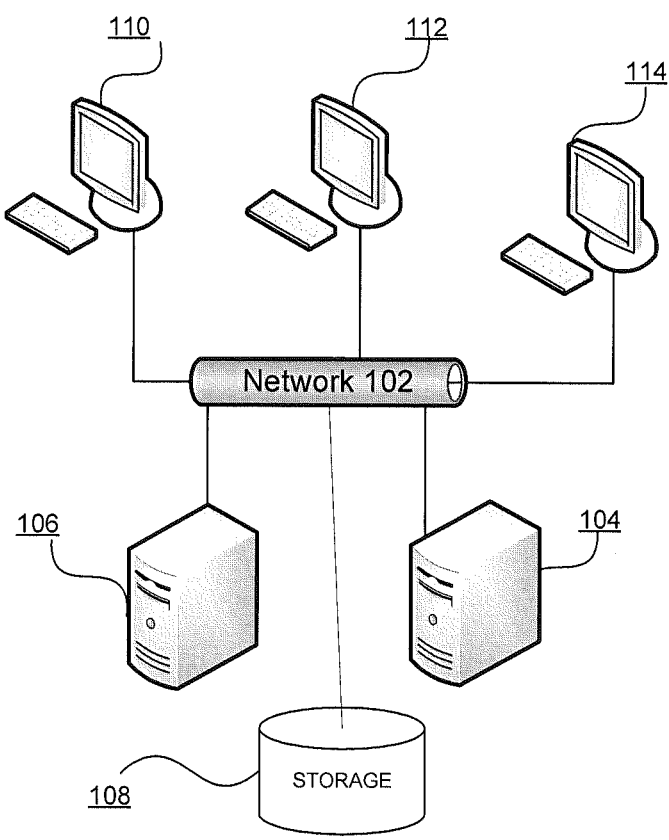
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
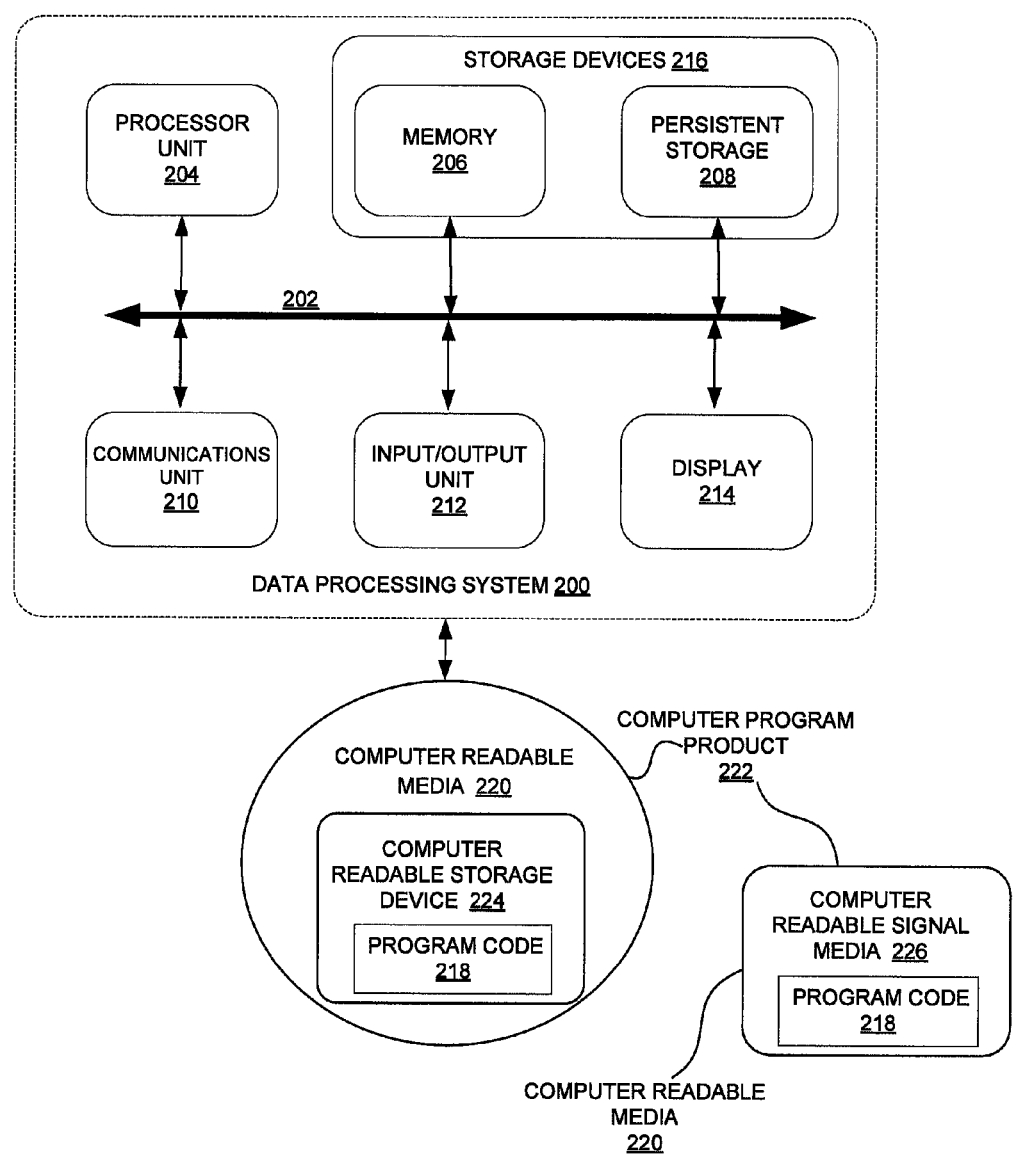
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments of a method for manipulating parse tree data and efficiently performing node order comparisons within the parse tree may be implemented. Network data processing system 100 is an example of a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. A server such as server 104 may be directed to perform the disclosed method of manipulating parse tree data and efficiently performing node order comparisons within the parse tree by a user on a client such as client 110.

In the depicted example, network data processing system 100 is the Internet with network 102 representing a worldwide collection of networks and gateways that use the transmission control protocol/Internet protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software, including instructions comprising the disclosed method of manipulating a parse tree structure and efficiently performing node order comparisons within the parse tree that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs, and the disclosed method of manipulating parse tree data and efficiently performing node order comparisons within the parse tree may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments of the disclosed method for manipulating parse tree data and efficiently performing node order comparisons within the parse tree may be embodied on different physical or tangible computer readable storage media, such as memory 206 or persistent storage 208.

Program code 218 is located in a functional form on computer readable media 220 that may be selectively removable, for example computer readable storage device 224 and may be loaded onto or transferred to data processing system 200 in the form of computer readable signal media 226 for execution by processor unit 204. Program code 218 and computer readable storage device 224 form one example of computer program product 222 and program code 218 and computer readable signal media 226 form another example in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage device, such as a hard drive, a thumb drive, or a flash memory that is connected to data processing system 200. The tangible form of computer readable media 220 is also referred to as computer recordable storage media or a computer readable data storage device. In some instances, computer readable media 220 may not be removable. Computer readable storage device 224 is an embodiment of a non-transitory computer readable media and does not encompass propagation media.

Alternatively, program code 218 may be transferred to data processing system 200 from computer readable media 220 through a communications link to communications unit 210 and/or through a connection to input/output unit 212 in the form of computer readable signal media 226. The communications link and/or the connection may be physical or wireless in the illustrative examples. Computer readable signal media 226 is an embodiment of transitory computer readable media.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process is presented for manipulating parse tree data and efficiently performing node order comparisons within the parse tree. Processor unit 204 receives a parse tree data structure, wherein the parse tree data structure is representative of a document object model (DOM) tree data structure. Concomitant to receiving, by processor 204, the parse tree data structure, receiving an assignment of index values for the DOM nodes consisting of distinct index values for each existing DOM node.

Processor 204 determines whether a request to manipulate the parse tree data structure or perform a node order comparison is an insert request. Responsive to a determination that the request is an insert request which comprises an insert DOM node request for a new DOM node and concomitant to receiving the request requesting to insert the new DOM node into the parse tree data structure, receiving, by processor 204, an indication of a parse tree insert location for the new DOM node to be inserted.

Responsive to receiving by processor 204 the indication of the parse tree insert location, processor 204 assigns a distinguishable index value to the new DOM node to be inserted. The assigned distinguishable index value is distinguishable from all distinct index values, but the assigned distinguishable index value may be equivalent to previously assigned distinguishable index values of other newly inserted DOM nodes whose distinguishable index values were assigned while processor 204 processed preceding requests to insert a new DOM node. Due to the possibility of equivalence of distinguishable index values as well as their categorical non-equivalence to all distinct index values, this method is referred to as a relaxed node indexing method. Concomitant to assigning a distinguishable index value to the new DOM node to be inserted, processor 204 inserts the new DOM node at the indicated parse tree insert location. The logical flow of processing the insert request terminates thereafter.

Responsive to a determination that the request to manipulate the parse tree data structure or perform a node order comparison is not an insert request, processor 204 determines whether the request is a node order comparison request, which is also called a document order comparison request. Responsive to a determination that the request is a node order comparison request, processor 204 receives a document order comparison request to determine an earlier of a first given DOM node and a second given DOM node. Responsive to the receiving, by processor 204, of a document order comparison request, processor 204 determines whether the document order comparison request can be satisfied by a comparison of the index values of the first given DOM node and the second given DOM node.

Responsive to a determination that the document order comparison request can be satisfied by a comparison of the index values of the first given DOM node and the second given DOM node, processor 204 selects as the earlier DOM node one of the first given DOM node and the second DOM node based on the comparison of the index values of the first given DOM node and the second given DOM node.

Responsive to a determination that the document order comparison request cannot be satisfied by the comparison of the index values of the first given DOM node and the second given DOM node, processor 204 selects as the earlier DOM node one of the first given DOM node and the second DOM node using a secondary comparison method.

Responsive to selecting the earlier DOM node by either a comparison of index values or a secondary comparison method, processor 204 provides the earlier DOM node as the result of the node order comparison, and the logical flow of processing of the node order comparison request terminates thereafter.

It will be apparent to those of ordinary skill in the art without departing from the scope and spirit of the invention that processor 204 may continue to process further requests and that processor 204 may process additional types of requests, such as a request to delete a DOM node and a request to re-index the parse tree data structure.

Figure 3:
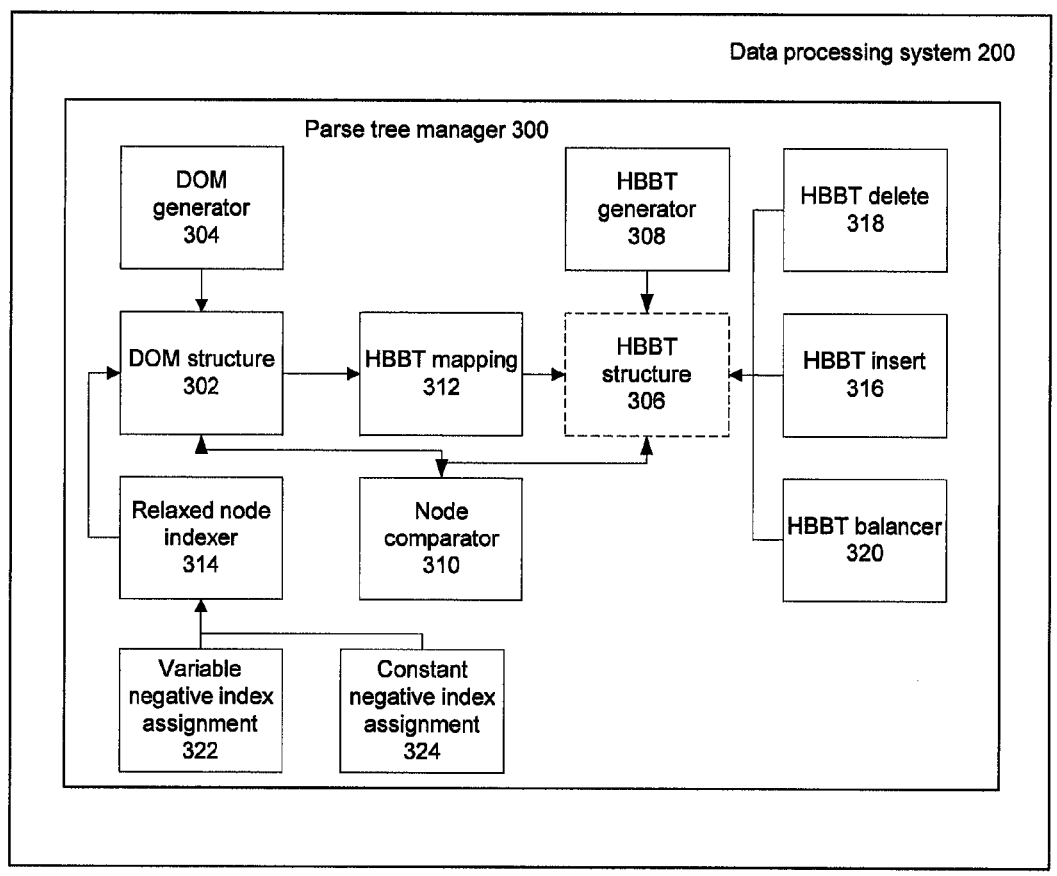
FIG. 3 is a block diagram of a parse tree manager operable for various embodiments of the disclosure.

With reference to FIG. 3 a block diagram of a parse tree manager operable for various embodiments of the disclosure is presented. Parse tree manager 300 is an example embodiment providing capabilities of manipulating parse tree data as disclosed.

Parse tree manager 300 leverages the underlying support of a data processing system such as data processing system 200 of FIG. 2 to provide typical system services for the operation of components comprising the manager. Parse tree manager 300 comprises a number of interdependent components as shown in the example of FIG. 3. The example illustrated is not meant to be limiting because the components shown may be configured in various combinations of more or less components according to specifics of an implementation. Logical functions may be combined into larger elements without loss of function. In the example described, a height-balanced version of a binary tree is used however a typical binary tree may also be used in an alternative embodiment.

DOM structure 302 is created using DOM generator 304 in a conventional manner. A DOM structure is a document object model represented in a tree data structure comprising a hierarchy of related nodes created using DOM generator 304. The document order relation of the DOM nodes is such that DOM node $D_X$ is considered to be earlier in the document order than a DOM node $D_Y$ if a pre-order traversal of the DOM tree data structure would visit $D_X$ before visiting $D_Y$.

Relaxed node indexer 314 provides a capability of a conventional node indexing mechanism with additional features. The additional features enable the total ordering imposed on node index values to be relaxed. A DOM node indexing method typically operates in an array like manner to map DOM nodes to integers, (index values) and therefore inherits the inefficiency of array insertion. Relaxed node indexer 314 enables a more efficient solution through relaxed ordering. During the relaxed node index operation, existing DOM nodes are assigned a depth first index value (DFI), and any subsequently inserted new DOM node is assigned an index value that is distinguishable from a DFI and which may make the node comparable to many other DOM nodes. Thus, DOM nodes are still compared, using node comparator 310, by respective index values, except when the comparison yields an inconclusive result, which depends on a negative index assignment technique, such as the technique provided by variable negative index assignment 322 or constant negative index assignment 324.

In one illustrative embodiment, constant negative index assignment 324 is used, wherein a value of −1, for example, is assigned to all newly inserted DOM nodes while in another illustrative embodiment variable negative index assignment 322 is used. Using the embodiment of the variable negative index assignment technique, the negative index value is calculated using an index value of either a predecessor or successor DOM node enabling a newly inserted DOM node to become comparable by index value to all other DOM nodes of DOM structure 302 except those newly inserted DOM nodes having the same index value.

Figure 4:
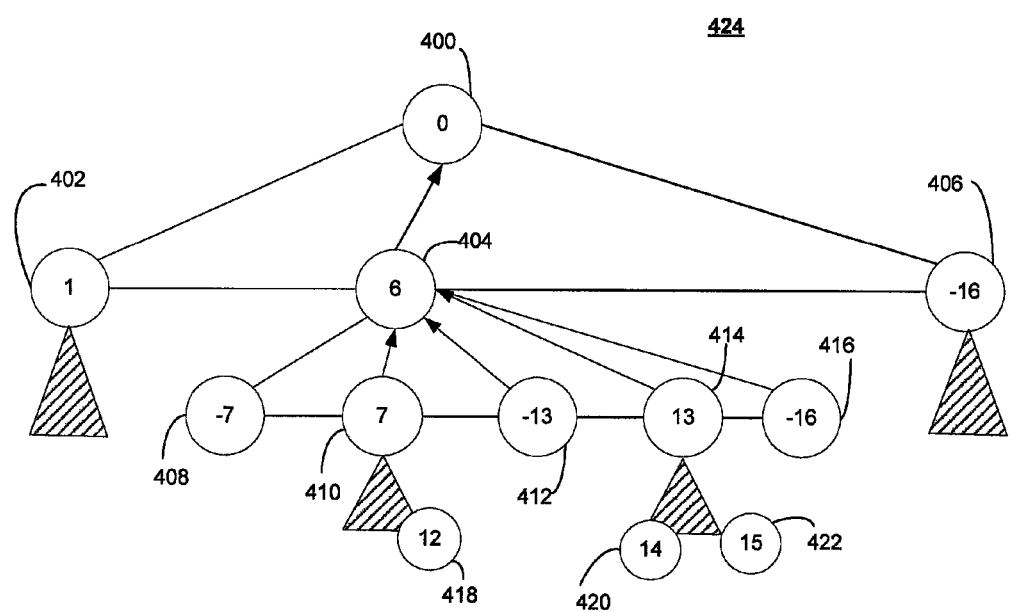
FIG. 4 is a block diagram of a DOM tree using variable negative indexing operable in accordance with one embodiment of the disclosure.

With reference to FIG. 4 a block diagram of a DOM tree using variable negative indexing operable for various embodiments of the disclosure is presented. DOM tree 424 is an example of a portion of a parse tree.

DOM tree 424 contains several non-negative index values assigned by a preceding depth first search index operation, as in root node 400, node 402, node 404, node 410, node 414, node 418, node 420 and node 422. DOM insertion of the nodes with the negative index values is examined in order from left to right. DOM node 408 is labeled −7 because a predecessor DOM node is labeled 6, and a variable negative indexing calculation expression of −6−1=−7. DOM node 412 labeled −13 is inserted with a successor node 414 that has a label value of 13, so in this instance K=12, and the variable negative indexing calculation yields −12−1=−13. The left node 416 labeled −16 is inserted as a last node of a respective parent node 404 having a value of 6, so a predecessor node is a rightmost descendant node 422 with a label of 15 of the preceding sibling node 414 with a label of 13, and the variable negative indexing calculation yields −15−1=−16. The rightmost node 406 labeled −16 is also inserted as the last node of a respective parent node 400 labeled 0, so a respective preceding sibling node 404 with a value of 6 is obtained, and a respective rightmost descendant is labeled −16, so the new node also receives this index value so that the new node joins the set of newly inserted nodes immediately after node 422 with label 15 in document order (pre-order traversal order).

Using constant negative index assignment 324, the index comparison of two DOM nodes is deemed inconclusive when either or both of the DOM nodes has a distinguishable index value, which is a constant negative integer such as the value −1. Using variable negative index assignment 322, the index comparison of two DOM nodes is deemed to be inconclusive when the index values of the respective DOM nodes of DOM structure 302 are equal. A secondary comparison technique is therefore required to resolve the inconclusive outcome. In one example of a secondary comparison technique, the conventional DOM tree traversal comparison method may be used, enabling the relaxed node index method to have value independently of HBBT mapping 312. However, HBBT structure 306 and HBBT mapping 312 can also be used as a secondary comparison technique.

HBBT structure 306 is created using HBBT generator 308. The HBBT structure is also a tree data structure, however the height balanced binary tree has different properties compared to the DOM structure. For example, an HBBT node has at most two child HBBT nodes. HBBT structure 306 provides a capability to represent the content of DOM structure 302 in a consistent and efficient manner useful for comparing node positioning. Let N be the number of nodes in the DOM structure 302 and hence also the HBBT structure 306, and let K be any integer such that 1<=K<=N. An in-order traversal of a binary tree first traverses the sub-tree rooted by the left child of a node, then visits the node, then traverses the sub-tree rooted by the right child of a node. The HBBT structure 306 is generated by HBBT generator 308 in such a way that a DOM node visited after K steps of a pre-order traversal of DOM structure 302 has an associated HBBT node that is visited after K steps of an in-order traversal of the HBBT structure 306. The synchronization between nodes in DOM structure 302 and corresponding nodes in HBBT structure 306 is managed using HBBT mapping 312. Further, the integrity and efficiency of HBBT structure 306 is maintained using HBBT balancer 320 to ensure the tree structure is compact and appropriately balanced.

When a node is inserted into DOM structure 302, a corresponding node is also inserted into HBBT structure 306 to maintain a structural affinity between the two data structures. Similarly, when a node is deleted from DOM structure 302, the associated HBBT node is deleted from HBBT structure 306. The HBBT structure 306 is balanced after a node insertion or deletion in order to maintain the property that the path between any two HBBT nodes has O(log N) length. Thus, as insert and delete operations are processed, parse tree manager 300 maintains a correspondence between DOM structure 302 and HBBT structure 306 to ensure that the successive DOM nodes in the pre-order traversal order in DOM structure 302 have corresponding HBBT nodes that match the in-order traversal order of HBBT structure 306.

Using an embodiment of the disclosed method, when a DOM node is inserted into DOM structure 302, a representative HBBT node is also created, associated with the inserted DOM node in HBBT mapping 312, and inserted into HBBT structure 306 using a specialized method of HBBT insert 316. The HBBT insert 316 receives the HBBT node corresponding to either the predecessor DOM node or the successor DOM node of the DOM node newly inserted into DOM structure 302. The received HBBT node will be the predecessor or successor node of the new HBBT node being inserted, and the HBBT insert 316 performs conventional tree navigation operations relative to the received HBBT node in order to identify the insertion location for the new HBBT node being inserted without using or requiring key comparisons among nodes in HBBT structure 306. Once HBBT insert 316 inserts the new HBBT node at the insertion location, the HBBT insert 316 performs the structural height balancing operation on HBBT structure 306. In a similar fashion, when a DOM node is deleted from DOM structure 302, the specialized operation HBBT delete 318 deletes the corresponding HBBT node from the HBBT structure 306 and then performs the structural height balancing operation on HBBT structure 306. The total cost of HBBT insert 316 is worst case O(log N). Obtaining the predecessor or successor DOM node of the DOM node being inserted is expected to take O(log N) time with a low constant factor due to the expected high branching factor of the DOM tree structure. The total cost of HBBT insert 316 is worst case O(log N).

The structure of HBBT structure 306 is exploited to provide an efficient comparator for DOM nodes. When two DOM nodes $D_X$ and $D_Y$ must be compared, Node comparator 310 first obtains their corresponding HBBT nodes from HBBT mapping 312, denoted X and Y, and then it performs within HBBT structure 306 a closest ancestor comparison method similar to the DOM tree traversal method to determine the earlier of X and Y in the in-order traversal order of HBBT structure 306. Specifically, the closest common ancestor of X and Y, denoted $H_A$, is obtained. If X is in the left sub-tree of $H_A$ or is equal to $H_A$, then X is earlier than Y, and otherwise Y is earlier than X because Y is in the left sub-tree of $H_A$ or is equal to $H_A$. Node comparator 310 provides the relative order result of X and Y in the HBBT structure 306 as the document order result for $D_X$ and $D_Y$ in the pre-order traversal order of DOM structure 302. Since the HBBT is a height balanced binary tree, the HBBT ancestor comparison method requires O(log N) time in the worst case, which is favorable to the worst case O(N) performance of the DOM tree traversal comparison method. Moreover, the disclosed method provides simultaneously efficient insert, delete and node comparison operations for DOM structure 302.

Although Java collections and C++ standard template libraries (STL) maps are also backed using data structures of height balanced binary trees, the two types of mappings are designed for use only with comparable objects. For example, an insertion operation for a new object (using either mapping) implicitly performs comparisons with similar objects already in the tree to locate a proper insertion point, and then the new object is placed in the tree and a structural height balancing is performed. Using an embodiment of the disclosed method, new objects are not comparable until after the objects are placed into the tree (rather than before as in the previous two types of mapping) because only after corresponding HBBT nodes are inserted is it the case that the structure of HBBT structure 306 is used to make DOM nodes of DOM structure 302 comparable to one another.

In one embodiment, HBBT structure 306 is simply a binary tree data structure rather than a height balanced binary tree data structure. The difference between the two data structures is that height balancing manipulations are performed after insert and delete operations only on a height balanced binary tree data structure. In the average case, a binary tree data structure also has O(log N) height, though its height may degrade to O(N) on some workloads. The binary tree data structure embodiment further illustrates the disclosed method is not reliant upon height balancing operations such as may be included in the map data structures of Java collections and C++ standard template libraries. Rather, height balancing is an additional feature that is also used in compliment with the disclosed method to help ensure logarithmic binary tree height in a worse case, thereby guaranteeing worst case logarithmic performance of the binary tree structure navigation used in a node comparison operation. Without height balancing, the node comparison operation still has an advantage of logarithmic performance in an average case, although performance may degrade to linear performance for some workloads. Meanwhile, insert and delete operations would typically be faster than when using a binary tree data structure, relative to using a height balanced binary tree structure.

In another illustrative embodiment, when relaxed node indexer 314 is used with variable negative index assignment 322 and with HBBT mapping 312 as the secondary comparison technique, then HBBT mapping 312 and the HBBT insert 316 and HBBT delete 318 operations can be further refined in such a way that HBBT structure 306 need only store newly inserted nodes, rather than all DOM nodes of DOM structure 302. Specifically, for each newly inserted DOM node, HBBT mapping 312 is amended to also store the absolute value of a negative index of the DOM node as a key value for the corresponding HBBT node. This allows the further refined HBBT insert 316 to find the insertion location for a new HBBT node even when the associated predecessor and successor DOM nodes of the DOM node have a non-negative index assignment and therefore no associated HBBT node.

Instead, under this illustrative embodiment, the insertion location is determined by performing a specialized binary tree search of HBBT structure 306 using the non-negative index value of the predecessor DOM node, denoted P, as the search key. Specifically, when an HBBT node is found whose key equals index of P, then the earliest such HBBT node in in-order traversal order is obtained, and a respective predecessor insertion location is used as the binary tree insertion location for the new HBBT node. Otherwise, the last binary tree node visited by the binary tree search is obtained and a respective binary tree predecessor or successor insertion location is selected as the binary tree insertion location for the new HBBT node based on whether the index of P is less or greater, respectively, than the key of the last binary tree node visited.

Under this illustrative embodiment, after the new HBBT node is inserted and HBBT structure 306 has been re-balanced by HBBT balancer 320, then HBBT mapping 312 is updated with the absolute value of the new DOM node associated with the new HBBT node. The further refined HBBT delete 318 is responsive to the non-existence of an associated HBBT node in HBBT mapping 312 for a DOM node being deleted, which occurs when the DOM node being deleted was included in the last index assignment operation and therefore has a non-negative index. In this case, the DOM node is simply deleted and HBBT delete 318 performs no change upon HBBT structure 306 since there is no HBBT node to delete. Node Comparator 310 requires no modification because it is only invoked as a secondary comparison when two DOM nodes have an equal and negative index value. In this case, both DOM nodes have associated HBBT nodes, and the relative order of HBBT nodes in an in-order traversal of HBBT structure 306 matches the order in which their associated DOM nodes are encountered in a depth first preorder traversal of DOM structure 302. In this alternative embodiment, the size and height of HBBT structure 306 is thus more compact than in an implementation accommodating all DOM nodes.

In another illustrative embodiment, the tree of DOM structure 302 is re-indexed, and HBBT structure 306 is returned to an empty state when HBBT structure 306 exists, because the re-indexing operation can be exploited for greater efficiency, for example, at certain well-defined events in the processing model of a scripting language such as XForms, which uses XML and XPath (XForms is an XML format for the specification of a data processing model for XML data and user interface(s) for the XML data). In another illustrative embodiment, a language processor, such as for XForms, is used to determine when to automatically perform a re-index operation based on a structural change detector, such as a rebuild flag or a specialized flag indicating the insertion of nodes since a last indexing operation was performed. The flag may be set using a predetermined number of insertions, including when a single insertion occurs. In another illustrative embodiment, the ability of the structural change detector to flag only the insertion of non-text nodes is used, thereby avoiding costly re-index operations when a text node insertion is used to change a value from an empty string to a non-empty value, which may be regarded as an informational mutation, and not a structural manipulation of the parse tree data structure.

Using an embodiment of relaxed node indexer 314, two DOM nodes, node $D_X$ and node $D_Y$, are usually comparable in $O(1)$ time despite DOM insertions or deletions of DOM structure 302, however performance may degrade in a special case when index comparison of node $D_X$ and node $D_Y$ is inconclusive, for example due to being equal and negative. When a secondary comparison is performed using the DOM tree traversal comparison method, the performance may degrade to $O(n)$, but insertion and deletion are usually $O(1)$ with variable negative index assignment 322, though technically the worst case is based on the DOM tree depth. When a secondary comparison uses a refined HBBT mapping 312, the performance of comparison typically only degrades to $O(\log n)$ in the special case, and the insert and delete operations typically only degrade in order of magnitude to an expected logarithmic time.

Note that n is not the number of nodes N in the tree of DOM structure 302 but rather the number of nodes inserted into the tree of DOM structure 302 and HBBT structure 306 since the DFI values were generated. For an empirical perspective of a typical improvement in processing, consider a DOM mutation script that expresses a variant of the quicksort and uses XPaths to indicate the nodes being sorted. By using the HBBT structure 306 to help the XPaths efficiently determine document order despite the quicksort mutations of the DOM structure 302, the performance typically improves from $O(n^2)$ to expected $O(n \log^2 n)$, where n is the number of nodes being sorted. For example, when n=1000 elements, an improvement in processing typically corresponds to a 10-fold performance increase for that DOM mutation script.

The disclosed method can also automatically benefit applications consuming a mutable data parse tree and a tree addressing mechanism imposing a document order on the addressed nodes. For example, forms applications using XForms could benefit from improving an XPath engine in a Java or C++ XForms processor. More generally, a Java servlet, business analytic or big data operator, or web service code that marshals data to and from an XML format could benefit from an improvement of the XPath engine used in node selections, particularly when structural mutations are required to marshal the data. For example, when a data model is based not on XForms but rather on a server side relational database, servlet code is used to map from the relational database content into a web service call, and the servlet code could be automatically optimized using the disclosed method, resulting in faster XML web service calls, particularly when the web service call returns an indeterminate number of result structures from database query.

Operations that re-index the parse tree data structure, and also return the binary tree projection and the binary tree data structure to an empty state, may also be performed within the context of an embodiment of the disclosed method. Further a language processor may be invoked to determine whether to automatically perform the re-index operation using a structural change detector, wherein the structural change detector sets a flag that indicates insertion of nodes since a last indexing operation. Further the structural change detector may only flag insertion of non-text nodes, wherein a text node insertion to change a value representative of an empty string to a value representative of non-empty string is regarded as an informational mutation, rather than a structural manipulation of the parse tree data structure.

An embodiment of the disclosed method may alternatively include use of a language processor which is responsive to an indication, by a language author using an attribute, indicating the requirement to apply, when executing a block of code associated with the attribute, at least one optimization from a set containing at least one of the following: binary tree projection, binary tree projection only on newly inserted nodes, height balancing, relaxed node index method, and variable negative index assignment.

Figure 5:
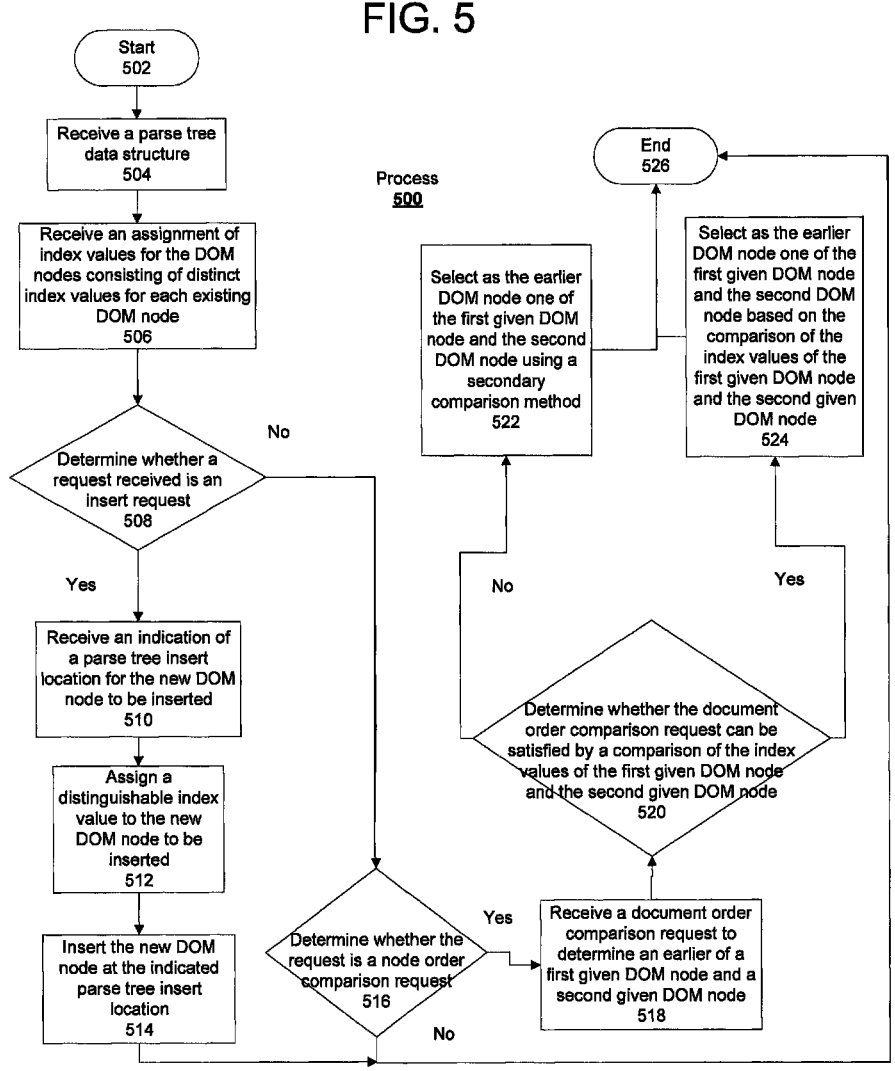
FIG. 5 is a flowchart of relaxed node indexing using the relaxed node indexer 314 of parse tree manager of FIG. 3 for various embodiments of the disclosure.

With reference to FIG. 5 a flowchart of relaxed node indexing using the relaxed node indexer 314 of parse tree manager of FIG. 3 for various embodiments of the disclosure is presented. Process 500 is an example of an embodiment using an enhancement of the depth first indexing operation of the parse tree manager 300 of FIG. 3 in which a constant negative index value is used.

Process 500 begins (step 502) and receives a parse tree data structure (step 504). Process 500 performs a depth first search of the tree data structure received to assign depth first index (DFI) values ranging from 0 to N−1 to the DOM nodes, where N is the number of DOM nodes. Process 500 accordingly receives the assignment of index values for the DOM nodes consisting of distinct index values for each existing DOM node (step 506). Each DOM node inserted after performing the depth first search is assigned a negative index value so that the index value assigned to new DOM node being inserted is distinguishable from the distinct index values assigned to DOM nodes during the depth first search index assignment (step 506).

Process 500 determines whether a request to manipulate the parse tree data structure or perform a node order comparison is an insert request (step 508).

Responsive to receiving a request to insert a new DOM node into the parse tree data structure, process 500 receives an indication of a parse tree insert location for the new DOM node to be inserted (step 510). Process 500 assigns a distinguishable index value to the new DOM node to be inserted (step 512). Process 500 inserts the new DOM node at the indicated parse tree insert location (step 514).

Responsive to a determination that the request is not an insert request, process 500 determines whether the request is a node order comparison request (step 516), which is also called a document order comparison request. Responsive to a determination the request is not a node order comparison request, the logical flow of request processing depicted in process 500 terminates (step 526). It will be apparent to those of ordinary skill in the art without departing from the scope and spirit of the invention that process 500 may continue to process further requests, beginning again at step 508, and that the logical flow may be augmented with additional types of requests, such as a request to delete a DOM node and a request to re-index the parse tree data structure.

Responsive to a determination the request is a node order comparison request, process 500 receives a document order comparison request to determine an earlier of a first given DOM node and a second given DOM node (step 518). Process 500 determines whether the document order comparison can be satisfied by a comparison of the index values of the first given DOM node and the second given DOM node (step 520).

Responsive to a determination the document order comparison cannot be satisfied by a comparison of the index values of the first given DOM node and the second given DOM node, process 500 selects the earlier of the first given DOM node and the second given DOM node using a secondary comparison method (step 522) and terminates thereafter (step 526). Responsive to a determination the document order comparison can be satisfied by a comparison of the index values of the first given DOM node and the second given DOM node, process 500 selects the earlier of the first given DOM node and the second given DOM node based on the comparison of the index values of the first given DOM node and the second given DOM node (step 524) and terminates thereafter (step 526). The node comparison, in step 524 is a primary comparison method using the index values of each of the two respective nodes being compared.

As previously mentioned, process 500 determines in step 520 whether the document order comparison can be satisfied by a comparison of the index values of the first given DOM node and the second given DOM node. The exact nature of this determination is based upon whether constant negative index assignment 324 or variable negative index assignment 322 is used during the processing of insert requests, and the exact nature of the determination is provided in the discussions of FIGS. 6 and 7, respectively.

Figure 6:
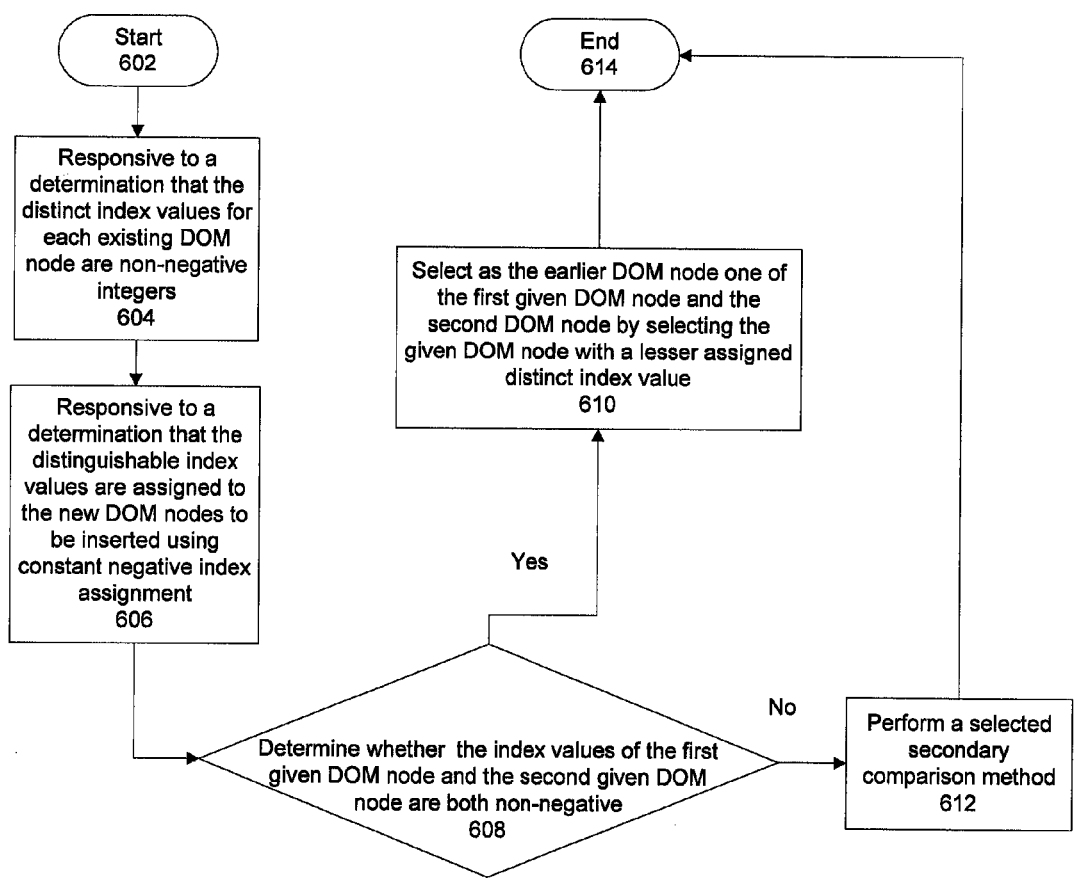
FIG. 6 is a flowchart of a process in which a new DOM node is assigned a constant negative integer as a distinguishable index value using the parse tree manager of FIG. 3 for various embodiments of the disclosure.

With reference to FIG. 6 a flowchart of a process in which the distinguishable index values assigned are a constant negative integer using the parse tree manager of FIG. 3 for various embodiments of the disclosure is presented.

Process 600 begins (step 602) and is responsive to a determination the distinct index values for each existing DOM node are non-negative integers (step 604). Further process 600 is responsive to a determination that the distinguishable index values are assigned to the new DOM nodes to be inserted using constant negative index assignment (step 606).

Process 600 determines whether the document order comparison request can be satisfied by a comparison of the index values of the first given DOM node and the second given DOM node by determining that the index values of the first given DOM node and the second given DOM node are both non-negative (step 608). The decision at step 520 of FIG. 5 corresponds to the decision at step 608 in the case of constant negative index assignment.

Responsive to a determination that the document order comparison request can be satisfied by a comparison of the index values of the first given DOM node and the second given DOM node, process 600 selects as the earlier DOM node one of the first given DOM node and the second DOM node by selecting the given DOM node with a lesser assigned distinct index value (step 610) and terminates thereafter (step 614). The operation of step 524 of FIG. 5 corresponds to the operation of step 610 in the case of constant negative integer assignment.

Responsive to a determination that the document order comparison request cannot be satisfied by a comparison of the index values of the first given DOM node and the second given DOM node, process 600 performs a selected secondary comparison method (step 612) and terminates thereafter (step 614). The operation of step 522 of FIG. 5 corresponds to the operation of step 612 in the case of constant negative integer assignment.

Figure 7:
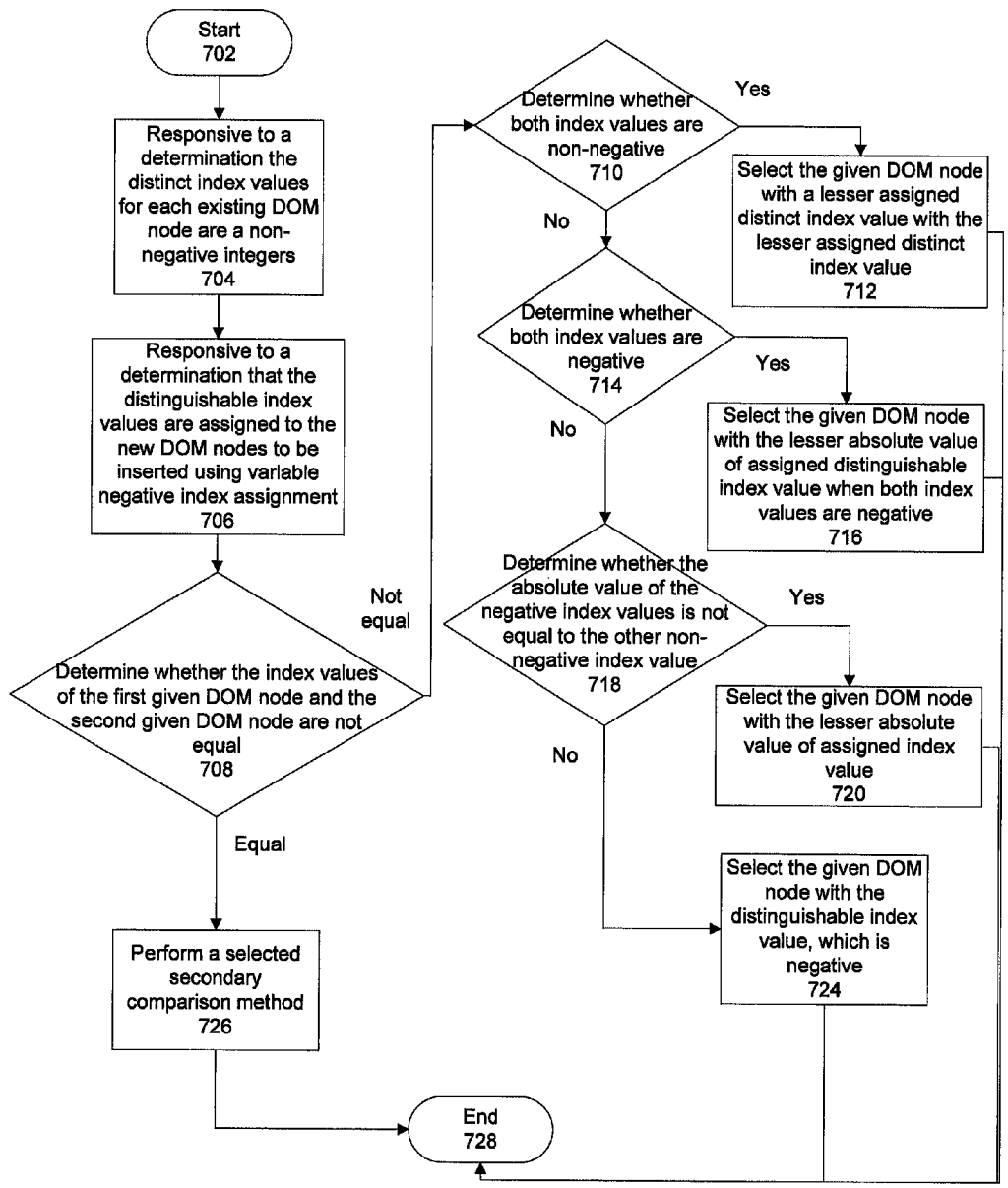
FIG. 7 is a flowchart of a process in which a new DOM node is assigned a variable negative integer as a distinguishable index value using the parse tree manager of FIG. 3 for various embodiments of the disclosure.

With reference to FIG. 7 a flowchart of a process in which the distinguishable index values assigned are variable negative integers using the parse tree manager of FIG. 3 for various embodiments of the disclosure is presented. Process 700 may be viewed as a further sub-process of process 500 of FIG. 5.

Process 700 begins (step 702) and is responsive to a determination the distinct index values for each existing DOM node are a non-negative integers (step 704). Further process 700 is responsive to a determination that the distinguishable index values are assigned to the new DOM nodes to be inserted using variable negative index assignment (step 706).

Process 700 determines whether the document order comparison request can be satisfied by a comparison of the index values of the first given DOM node and the second given DOM node by determining that the index values of the first given DOM node and the second given DOM node are not equal (step 708). The decision at step 520 of FIG. 5 corresponds to the decision at step 708 in the case of variable negative index assignment.

Responsive to a determination that the document order comparison request can be satisfied by a comparison of the index values of the first given DOM node and the second given DOM node, process 700 determines whether both index values are non-negative (step 710).

Responsive to a determination that both index values are non-negative, process 700 selects as the earlier DOM node one of the first given DOM node and the second DOM node the given DOM node with a lesser assigned distinct index value (step 712). Responsive to a determination that at least one index value is negative, process 700 determines whether both index values are negative (step 714). Responsive to a determination that both index values are negative, process 700 selects the given DOM node with the lesser absolute value of assigned distinguishable index value (step 716).

Responsive to a determination that one of the index values is negative and the other is not negative, process 700 determines whether the absolute value of the negative index values is not equal to the other non-negative index value (step 718). Responsive to a determination that only one of the index values is negative and its absolute value is not equal to the other index value, process 700 selects the given DOM node with the lesser absolute value of assigned index value (step 720). Responsive to a determination that only one of the index values is negative and its absolute value is equal to the other index value, process 700 selects the given DOM node with the distinguishable index value, which is negative, when only one of the index values is negative and its absolute value is equal to the other index value (step 724). After selecting the earlier DOM node at one of step 712, step 716, step 720 and step 724, process 700 and terminates thereafter (step 728). The operation of step 524 of FIG. 5 corresponds to the operations of steps 710, 712, 714, 716, 718, 720 and 720.

In one embodiment, the index values assigned with the variable negative index assignment can be compared by an alternative implementation. For example, the lesser of DOM nodes $D_X$ and $D_Y$ can be selected by performing the following sequence. First, select $D_X$ when the absolute value of the index of $D_X$ is less than the absolute value of the index of $D_Y$. Otherwise, select $D_X$ when the index of $D_X$ is negative and the absolute value of the index of $D_X$ equals the absolute value of the index of $D_Y$. Otherwise, select $D_Y$.

Responsive to a determination that the document order comparison request cannot be satisfied by a comparison of the index values of the first given DOM node and the second given DOM node, process 700 performs a selected secondary comparison method (step 726) and terminates thereafter (step 728). The operation of step 522 of FIG. 5 corresponds to the operation of step 726 in the case of variable negative integer assignment.

Figure 8:
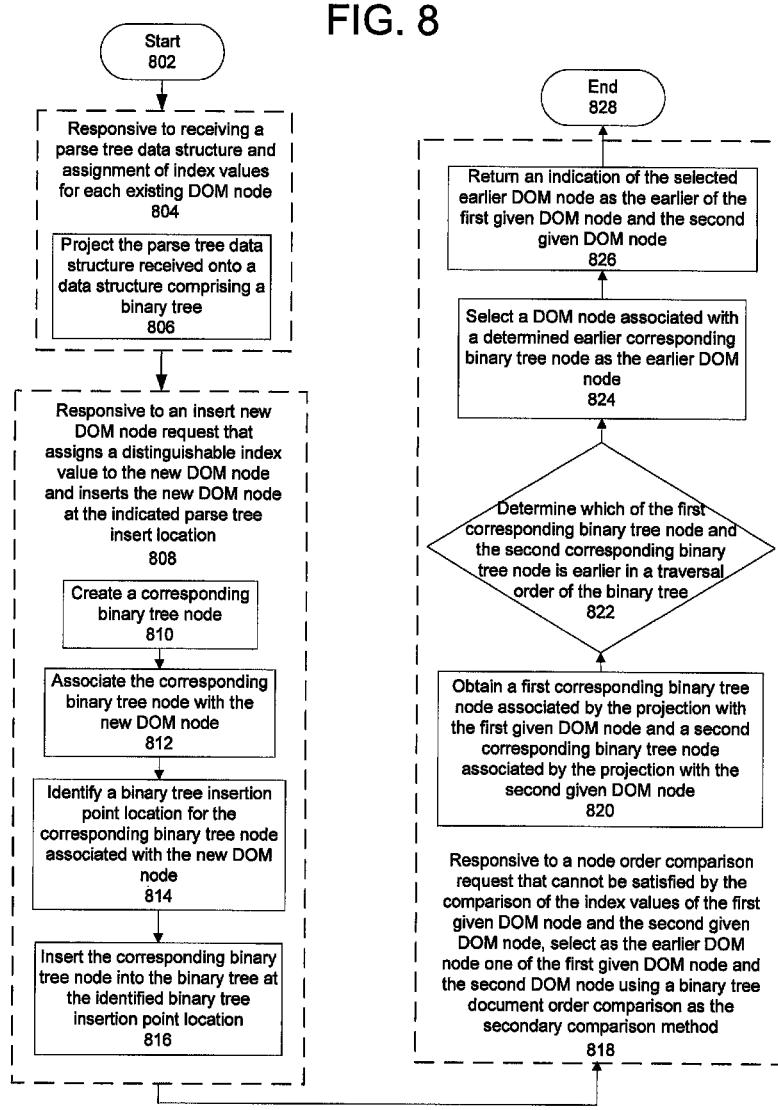
FIG. 8 is a flowchart of a process in which a binary tree projection with pre-order DOM mapped to in-order binary tree, with parallel binary tree insertion, is used to support binary tree comparison for a secondary comparison using the parse tree manager of FIG. 3 for various embodiments of the disclosure.

With reference to FIG. 8 a flowchart of a process in which a binary tree projection with pre-order DOM mapped to in-order binary tree, with parallel binary tree insertion, enables use of a binary tree document order comparison method for the secondary comparison method using the parse tree manager of FIG. 3 for various embodiments of the disclosure is presented. Process 800 is an example of using a binary tree document order comparison as the secondary comparison method.

Process 800 begins (step 802) and responsive to receiving a parse tree data structure and assignment of index values for each existing DOM node (step 804) projects the parse tree data structure received onto a data structure comprising a binary tree, subsequent to receiving a parse tree data structure (step 806). The projection stores an association between each DOM node in a successive pre-order traversal of the parse tree and each binary tree node in a successive in-order traversal of the binary tree thereby creating a map between the parse tree data structure and the binary tree data structure.

Responsive to an insert request to insert a new DOM node at an indicated parse tree location, process 800 augments the processing of the insert request indicated by steps 512 and 514 of FIG. 5. Process 800 assigns a distinguishable index value to the new DOM node and inserts the new DOM node at the indicated parse tree insert location (step 808), which corresponds to steps 512 and 514 of FIG. 5. Process 800 then creates a corresponding binary tree node (step 810), associates the corresponding binary tree node with the new DOM node (step 812), identifies a binary tree insertion point location for the corresponding binary tree node associated with the new DOM node (step 814), and inserts the corresponding binary tree node into the binary tree at the identified binary tree insertion point location (step 816).

Responsive to a node order comparison request that cannot be satisfied by the comparison of the index values of the first given DOM node and the second given DOM node, process 800 selects as the earlier DOM node one of the first given DOM node and the second DOM node using a binary tree document order comparison as the secondary comparison method (step 818). Using the binary tree document order comparison, process 800 obtains a first corresponding binary tree node, denoted X, associated by the projection with the first given DOM node and a second corresponding binary tree node, denoted Y, associated by the projection with the second given DOM node (step 820). Process 800 determines which of the first corresponding binary tree node and the second corresponding binary tree node is earlier in a traversal order of the binary tree (step 822). Specifically, the closest common ancestor of X and Y, denoted $H_A$, is obtained. If X is in the left sub-tree of $H_A$ or is equal to $H_A$, then X is earlier than Y, and otherwise Y is earlier than X because Y is in the left sub-tree of $H_A$ or is equal to $H_A$. Process 800 selects a DOM node associated with a determined earlier corresponding binary tree node as the earlier DOM node (step 824). Process 800 returns an indication of the selected earlier DOM node as the earlier of the first given DOM node and the second given DOM node (step 826) and terminates thereafter (step 828).

In an alternative embodiment, process 800 may be further equipped with a subprocess that is responsive to a delete request to delete a DOM node as well as a binary tree node associated with the DOM node by step 806 or step 812.

In an alternative embodiment, process 800 may be further equipped with height balancing operations, such as red-black tree rotations, performed upon the binary tree structure when a binary tree node is inserted or deleted, corresponding to the insertion of a new DOM node or deletion of a DOM node. In this embodiment, the binary tree structure is a height balanced binary tree (HBBT).

Figure 9:
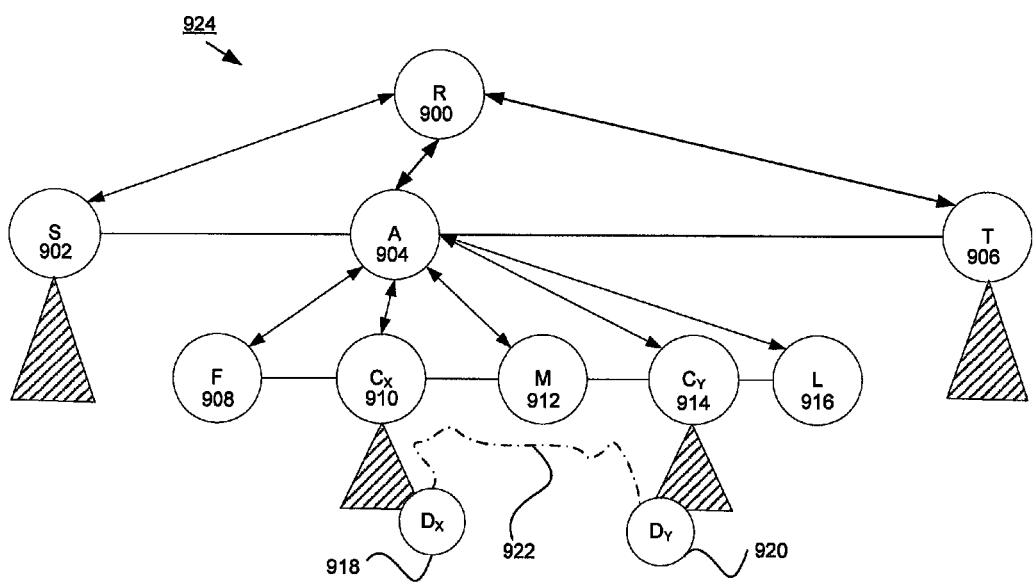
FIG. 9 is a block diagram of a document object model parse tree in accordance with an embodiment of the disclosure.

With reference to FIG. 9 a block diagram of a document object model parse tree operable for various embodiments of the disclosure is presented. Parse tree 924 is an example of DOM structure 302 of FIG. 3. Using the example parse tree 924 the DOM tree is rooted by node R 900, and DOM nodes comprising node S 902, node A 904, and node T 906 are among the DOM children of node R 900. In one technique of storing DOM trees, each DOM node has pointers or indicators to a respective parent, first child, last child, and previous and next sibling. The child list of a DOM node is traversed beginning at the DOM node and traversing to a first child, then continuing along next sibling pointers of each child until the DOM node of a last child is reached. For example, node A 904 has a child list that starts with node F 908, and then includes node $C_X$ 910, node M 912, node $C_Y$ 914, and ending with node L 916.

In the example of the DOM tree of parse tree 924, horizontal lines illustrate sibling connections, (such as those from node S 902 to node A 904 and node T 906) and diagonal lines (such as those linking child nodes of node $C_X$ 910, node M 912, node $C_Y$ 914, and node L 916 with parent node A 904) indicate bi-directional parent-child connections. The curvy dashed representation of line 922 represents the main work performed by the DOM tree traversal comparison method to determine a relative document order of two DOM nodes $D_X$ 918 and $D_Y$ 920.

For the sake of clarity, note that nodes 918 and 920 in FIG. 9, which are labeled $D_X$ and $D_Y$, correspond to nodes 418 and 420 in FIG. 4, and they are directly comparable by the index values shown in FIG. 4. In an alternative index assignment, if all nodes in the subtree rooted by node 404 of FIG. 4 were newly inserted DOM nodes, then nodes 404 through 422 would all have the same assigned distinguishable index value, in which case a secondary comparison method would be required to determine the relative order of the nodes 418 and 420. One such secondary comparison method is the DOM tree traversal comparison method, which was illustrated above in FIG. 9. Another secondary comparison method is the binary tree comparison method, which may be performed with a binary tree structure or with a HBBT structure and which is illustrated with FIG. 10.

Figure 10:
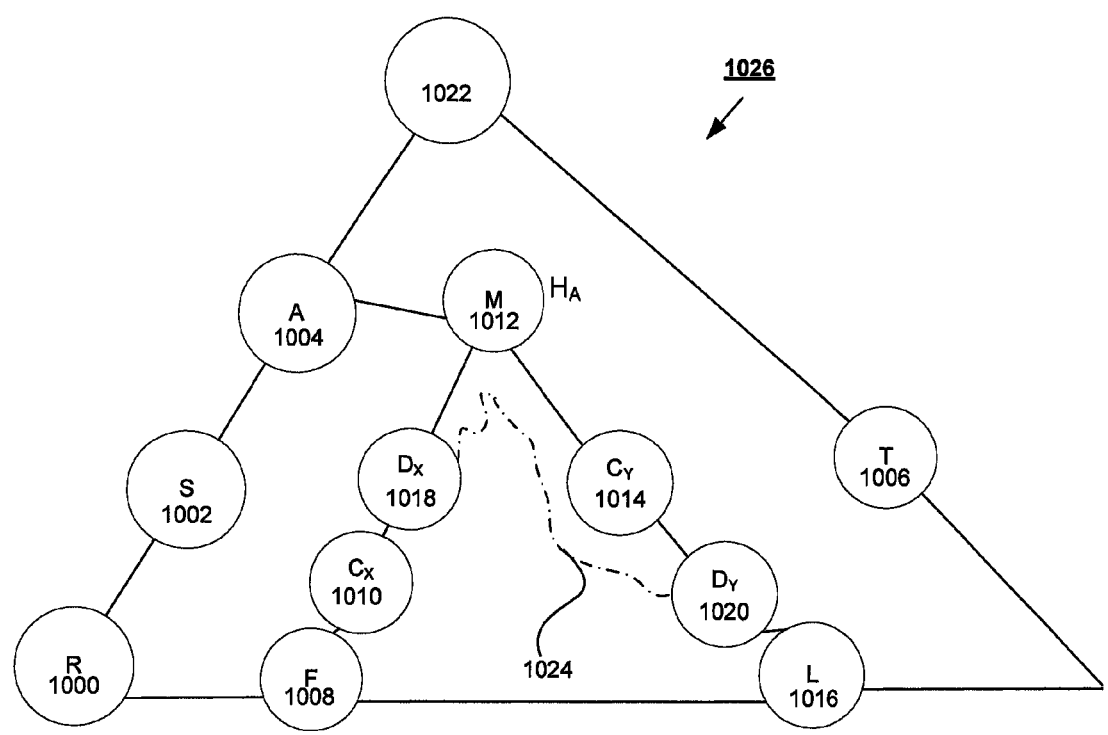
FIG. 10 is a block diagram of a height balanced binary tree representative of the document object model parse tree of FIG. 9, in accordance with one embodiment of the disclosure.

With reference to FIG. 10 a block diagram of a height balanced binary tree operable for various embodiments of the disclosure is presented. HBBT 1024 is an example of HBBT structure 306 of FIG. 3 corresponding to DOM tree structure of parse tree 924 of FIG. 9.

HBBT 1026 depicts how various DOM nodes of parse tree 924 of FIG. 9 would be mapped into a height-balanced tree structure. For example, DOM root R 900 is associated with a leftmost HBBT node 1000 because node R 900 of FIG. 9 is first in the document order of the DOM of parse tree 924. Similarly, node S 902 is before node A 904 in the DOM represented by parse tree 924 of FIG. 9, and a respective representative HBBT node S 1002 is in the left HBBT sub-tree of the HBBT node A 1004 associated with node A 904 of FIG. 9. Descendants of node A 904 of FIG. 9 are located later in the document order of the DOM, and are therefore also located in the right HBBT sub-tree of the HBBT node associated with node A 1004, including HBBT node F 1008, node $C_X$ 1010, $D_X$ 1018, node M 1012, $C_Y$ 1014, node $D_Y$ 1020, and, node L 1016. Siblings of node A 904 in the DOM of FIG. 9 are located logically later in the HBBT 1026, as depicted by an appearance as an ancestor of node A 1004 and a right sub-tree, which includes the HBBT node T 1006 associated with node T 906 of FIG. 9. Node M 1012 is also referred to as $H_A$ because it is the closest common ancestor of child node $C_X$ and child node $C_Y$ in HBBT 1026.

Although the DOM document order is based on a pre-order interpretation of the DOM structure of parse tree 924 of FIG. 9, the HBBT 1026 provides the DOM document order based on an in-order traversal of the HBBT 1026. The curvy dashed representation of line 1024 represents the main work performed by the HBBT comparison method to determine a relative order of HBBT node $D_X$ 1018 and node $D_Y$ 1020.

With reference to using the relaxed node method in combination with a secondary comparison using the HBBT mapping method, when the depth first search is used to create a node index for the DOM tree, a parallel HBBT is also created in which one node is associated with each existing DOM node. Each DOM insert operation is augmented by not only assigning a negative node index previously described, but also by performing an HBBT insert operation. Similarly, DOM deletion is augmented using the HBBT delete operation. When the relaxed node index method is used in combination with the HBBT map method as a secondary tree-based comparison technique, the insert and delete operations require O(log N) expected time and node comparison is often O(1) and only degrades to O(log N) in the special case described previously.

With reference to a secondary comparison via a refined HBBT mapping method, in a context of the relaxed node index method with variable negative index assignment, the HBBT mapping method can be improved, using refined HBBT insert and refined HBBT delete operations, enabling only newly inserted DOM nodes with a negative index value to have representative HBBT nodes. Using this combination of refined operations, the size of the HBBT is not N, the number of DOM nodes, but rather reduced to n, the number of newly inserted DOM nodes since a last DOM node index assignment operation.

As in the secondary comparison of two DOM nodes $D_X$ and $D_Y$, the HBBT-based comparison is used without alteration because only in the special case when $K_X=K_Y$, is it used, wherein both node $D_X$ and node $D_Y$ have negative index values and also both have associated HBBT nodes. Each HBBT node is thus augmented with an additional integer value that will, in some cases, be used as a key for finding the node in the HBBT. The key is, in this instance, assigned a non-negative value K, where the associated DOM node has the negative index value of −K−1.

When the depth first search is used to create the node index for the DOM tree, all existing DOM nodes are set to have no associated HBBT node, and the HBBT is set to empty. The DOM insert operation is augmented by the refined HBBT insert operation, and the DOM delete operation is augmented by the refined HBBT delete operation.

With reference to the refined HBBT delete, when a DOM node is deleted, an additional conditional test is added to determine whether the DOM node has an associated HBBT node, and a normal HBBT delete is only performed when there is an associated HBBT node.

With reference to the refined HBBT insert, when a new DOM node is inserted, the predecessor DOM node or successor DOM node is still identified, because an associated DOM node is needed to complete the variable negative index assignment for the DOM node being inserted. When the identified predecessor or successor DOM node has a negative index value, the original HBBT insert operation is performed. When the identified predecessor or successor DOM node has a non-negative index value, the node does not have an HBBT node to use as a basis for determining the insertion point for the new HBBT node associated with the new DOM node. In this case, the insertion point is instead determined using a key search of the HBBT based on the index value of the identified predecessor or successor DOM node.

When the predecessor DOM node of the new DOM node was identified, let K denote a respective non-negative index value. When the successor DOM node of the new DOM node was identified, let K+1 denote a respective non-negative index value. Using either approach, the new DOM node is assigned an index −K−1, and the value K is used in a key search of the HBBT for the insertion point according to a binary search tree navigation. The search starts at the root node of the HBBT. When K is less than the HBBT node key value, then navigate to the left child when there is a child or select the left pointer as the insertion point when nil. Otherwise, when K is greater than to the HBBT node key value, navigate to the right child when a child exists or select the right pointer as the insertion point when nil. Otherwise, when K is equal to the HBBT node key value, navigate to the left child when the predecessor DOM node was given, and navigate to the right child when the successor DOM node was given. Continue navigating nodes as described until the insertion point is obtained. Then, insert the new HBBT node associated with the new DOM node, assign a key value K, and perform a height balancing operation.

In reference to automatic and manual re-indexing, regardless of the secondary tree-based comparison method used, applications of the relaxed node index method typically benefit from the ability to re-index the DOM nodes at selected points in the processing. Re-indexing is performed by invoking a depth first search, which assigns non-negative index values to all existing DOM nodes, extinguishing any negative index values that were previously assigned to any of the DOM nodes. The author of an application, using an explicit invocation at any point or points in a DOM processing sequence the author deems appropriate, can access re-indexing. Re-indexing may also be provided as an automated behavior of an application language when the language supports epochs of index relaxation that are distinguishable from epochs of index non-volatility, for example when using XForms language.

An XForms insert action typically sets a flag called a rebuild flag, and inserts one or more nodes that receive a negative index value under this method. Many further XForms actions may occur in a sequence of XForms actions, including many additional insert actions. During the sequence of XForms actions, an application author may elect to explicitly invoke a rebuild action. Otherwise, when the rebuild flag is still set in the XForms processor at the end of an outermost action sequence, the XForms processor automatically invokes the rebuild action.

Whether the rebuild is automatically invoked or explicitly invoked, a new depth first search can be performed to re-index XML data instances that have been amended to contain DOM nodes with negative values. This is implemented by reusing the stale flag technique. When a DOM node is inserted, the stale flag is set to indicate the next XForms rebuild should re-index the nodes. The stale flag is cleared when the nodes are re-indexed.

In one refinement, handling of text node insertions may be performed as informational changes rather than structural changes. The handling technique can be further refined to ignore text DOM nodes assigned a negative index value, so that re-indexing only occurs when nodes, such as elements or attributes, have been inserted that are more typically pertinent in document order comparisons in XPath expressions. This can be easily implemented by not setting the stale flag when a text node is inserted.

In another refinement, optimizing XForms DOM element initialization can be used in combination with the relaxed node index method to optimize XML data instance initialization relative to current practice using XForms. When an XML instance is parsed, elements with empty content do not receive a child text node. When those elements are subjected to an informational mutation during processing, for example, when the elements are assigned a non-empty text value, a text node is created to store the non-empty value. Technically, this is a structural mutation of the DOM (that is to say, a structural manipulation of the parse tree data structure) since a new node is inserted, and in prior practice the insertion caused the node index to be marked stale.

However, by creating empty text node children for all leaf elements the nodes are indexed on initialization and no DOM structural changes occur when an element text value is changed. Moreover, any time a DOM element leaf was inserted, the empty text node is created for holding respective content enabling accommodation in a following re-index operation. The creation of empty text nodes uses available memory and time, especially on form initialization but often in the whole processing lifecycle of the form because, in a multistep business process or fill experience, a user may only fill out the parts of the form that are relevant to the transaction details or business process step of the user. The empty text nodes for the non-relevant parts of the form should not be created, but there is no way to easily determine or specify the non-relevant sections of the XML data during parse tree or DOM initialization.

Using the relaxed node index method, the technique of creating empty text nodes for leaf elements can simply be abandoned. When a text node is inserted to store a non-empty value provided by a user, the text node receives a negative index value, but the stale flag is not set. Therefore, when only text nodes are added, the mutations are handled as informational, not structural, which is coincident with the XForms processing model which does not invoke a rebuild when only value changes have occurred. The new text nodes are extremely unlikely to be involved in document order comparisons of XPath expressions typically executed in XForms. Moreover, even should there be unusual XPath expressions that do involve these text nodes in document order comparisons, the text nodes are likely to be the lone children of respective parent elements, in which case both the index assignment and comparisons to other nodes will be $O(1)$ under the variable negative index assignment technique.

Thus is presented in an illustrative embodiment a method implemented by one or more processors for manipulating parse tree data and efficiently performing node order comparisons within the parse tree. The method when executed by the one or more processors receives a parse tree data structure, wherein the parse tree data structure is representative of a document object model (DOM) tree data structure and concomitant to receiving, by the one or more processors, the parse tree data structure, receiving an assignment of index values for the DOM nodes consisting of distinct index values for each existing DOM node. The method when executed by the one or more processors receives a request to manipulate the parse tree data structure or perform a node order comparison and determines whether the request comprises an insert DOM node request for a new DOM node. Responsive to a determination that the request comprises an insert DOM node request for a new DOM node and concomitant to receiving the request requesting to insert the new DOM node into the parse tree data structure, an indication of a parse tree insert location for the new DOM node to be inserted is received by the one or more processors.

Responsive to receiving by the one or more processors the indication of the parse tree insert location, the one or more processors assigns a distinguishable index value to the new DOM node to be inserted and inserts the new DOM node at the indicated parse tree insert location, terminating thereafter.

Responsive to a determination that the request does not comprise an insert DOM node request for a new DOM node, the one or more processors determine whether the request is a node order comparison request, which is also called a document order comparison request. Responsive to a determination that the request is a node order comparison request, the one or more processors receives a document order comparison request to determine an earlier of a first given DOM node and a second given DOM node.

The one or more processors determine whether the document order comparison request can be satisfied by a comparison of the index values of the first given DOM node and the second given DOM node. Responsive to a determination that the document order comparison request can be satisfied by a comparison of the index values of the first given DOM node and the second given DOM node, the one or more processors selects as the earlier DOM node one of the first given DOM node and the second DOM node based on the comparison of the index values of the first given DOM node and the second given DOM node. Responsive to a determination that the document order comparison request cannot be satisfied by the comparison of the index values of the first given DOM node and the second given DOM node, the one or more processors selects as the earlier DOM node one of the first given DOM node and the second DOM node using a secondary comparison method. Once the selected earlier DOM node is provided by the one or more processors as the result of the node order comparison request, the logical processing of the node order comparison request terminates thereafter.

It will be apparent to those of ordinary skill in the art without departing from the scope and spirit of the invention that the one or more processors may continue to process further requests, including insert requests and node order comparison requests, and that the one or more processors may process additional types of requests, such as a request to delete a DOM node and a request to re-index the parse tree data structure.

The methods thus disclosed have broad applicability particularly in the domain of forms products in the area of manipulating XML DOMs and efficiently performing node order comparisons within the parse tree with XPath, and the innovative techniques disclosed herein may drive efficiency of navigating a dynamic general tree as a data structure. General trees often occur in practice as in-memory representations of parse trees for languages and data formats.

Computer languages include hypertext markup language (HTML), cascading style sheets (CSS), JavaScript, and Java as well as many languages based on XML format, such as extensible stylesheet language transformations (XSLT) and scalable vector graphics (SVG) use parse tree data. Parse trees would be created to represent a program within a program design environment. Tree navigation would be performed to search for program components having desired characteristics, and manipulations could be performed once desired components are found, such as implementing aspect oriented injections into the code.

Natural language content is also represented using a parse tree. Tree navigation is used to identify meaning based on patterns. Manipulation would be done to construct or alter meaning, such as generating language to express or alter thoughts. The manipulation could also include dynamic translation from one language to another.

Embodiments of the disclosure providing the most value in the shortest term are typically those, which both manipulate the parse tree structure and perform node order comparisons. Embodiments of the disclosure would typically be usable in any software that manipulates a parse tree and uses a tree order enforcing expression language to identify the nodes to manipulate and compare, wherein tree order enforcement of the expression language naturally results in many document order comparisons among the nodes over which the expressions operate.

For example, a case of XML being the format of data being parsed into a document object model (DOM) and then using XPath as the document order enforcing expression language that indicates the nodes to insert, where to insert the nodes, or which nodes to delete. In the XML context, this processing includes changing the character content of an element between empty and non-empty, since those operations correspond to creating or destroying text nodes, which are structural manipulations of the parse tree.

Software examples of use of embodiments of the disclosure are numerous; including business analytic or big data operators as well as web service request and response code that parses an XML SOAP request or response envelope then populates the request or response envelope with a data payload. Graphic user interface design environments provide mapping mechanisms that typically reduce to a set of XPath expressions indicating specific data to push to a target location, and the run-time implementations of those mappings then perform the XML manipulations using evaluations of the XPath expressions. Java, C++ or C# code can also use XPath to identify nodes which are then populated with data. Neither product level mapping code nor custom code is limited to web services and business analytic or big data operators. Typically any type of data population activity is subject to beneficial use of embodiments of the disclosure.

In the XML Forms domain, XML forms include a scripting language with directives named insert, delete and setvalue. These script directives give a form author the capability to specify manipulations of the XML data within the Form to control the user experience in the form. Although a form may be the driver for an end-user client-side experience of a data collection web application, the XML processing is almost always performed on the server side.

In addition the language processor automatically performing re-indexing and/or emptying an HBBT, the language processor is responsive to an indication by a language author, for example, an attribute, indicating which optimization(s) from among a set of predetermined optimizations to apply when running an indicated block of code. For example, a first value of an optimization identifier is used to indicate a use of the relaxed node index method when procedures of a code particular code segment would benefit best from just using relaxed indexing. In another example, a second value of the optimization identifier is used when another code segment benefits from using variable relaxed indexing and HBBT together. A default may be set to not applying any of the predetermined optimizations.

Whether using web services code, a dedicated server-side processor or mapper, a business analytic or big data operator, or any other typical code running on the server-side, the efficiency of an embodiment of the disclosure is important due to the number of simultaneous application instances an embodiment is expected to serve. First, there is typically a great multiplicity of expressions that are evaluated during the course of data manipulations. This is true of forms, of mapping code, and of normal application-specific data population code. Thus, there are many expressions to be evaluated per each of many users. Second, a single expression that address a parse trees typically contains multiple location steps that navigate from a root of the parse tree down to internal nodes and leaves to obtain nodes to be manipulated. Each location step generates a node set that has to be put in parse tree order, or document order (in the XML domain, the XML data instance provides the document of interest). Third, each location step can contain filters that produce new node sets, and each filter contains sub-expressions that may be comprised of more location steps and filters. The XPath expression language is recursive. Fourth, the formation of an ordered node set typically involves systematic comparisons of the nodes. Thus, in total there are many node comparisons per (location step or filter) multiplied by many (location steps and filters) per expression multiplied by many expressions per application instance multiplied by many application instances per server.

Embodiments of the disclosure optimize a comparison function that takes two nodes of a parse tree and indicates which of the two nodes comes earlier in the parse tree, where earlier means that a respective node would be visited earlier in a left-to-right pre-order depth first search.

A first illustrative embodiment of the disclosure involves a novel projection of the structure of the dynamic parse tree onto the structure of a dynamic height balanced binary tree. A general tree is a different kind of mathematical object than a binary tree, in the same sense that a two dimensional space is a different geometric object from a three dimensional space. Inserting a node into a parse tree is a minor structural change in which a single edge is added to connect the new node to a respective parent, and one or two structural changes are made to attach the node to its preceding and succeeding siblings in the parent's children list. In the height balanced binary tree, there may be a corresponding avalanche effect of structural changes, such as a series of red-black tree rotations, because a node simply cannot have more than two children. So two very similar looking parse trees may have very different corresponding binary trees that nonetheless, by using an embodiment of the disclosure, are maps that efficiently encode the parse tree order of the parse tree in a way that allows efficient transition from one binary tree structure to the other tree structure. The meta-technique used in the disclosed methods is a reduction that maps a problem in one domain (general trees) into a problem in another domain (binary trees) where the problem is more efficiently or more easily solved. The innovation exhibited in a reduction is derived from identifying what to map and how to derive a benefit from the mapping.

A second illustrative embodiment of the disclosure is a relaxed node index method. This relaxed node index method is based on another meta-technique called relaxation in which some strictly applied computing rule is relaxed in a way that reduces a workload while still allowing the ability to achieve some objective. The innovation in any relaxation is achieved in identifying what to relax, how to perform the relaxation, and how to still derive benefits from the relaxation. In this illustrative embodiment of the disclosure, the condition of having the node indexes strictly reflect a depth first indexing of the parse tree is relaxed. Instead of a strict reflection, marking of the index map as stale when a parse tree manipulation happens is suppressed. Observation revealed that any deletion did not affect the index comparability of any remaining nodes. Further, newly inserted nodes are assigned an alternative index to indicate they are not directly comparable to the original nodes having valid indexes. The alternative index assignment was improved to mark newly inserted nodes as being in a region of insertion between two specific original nodes having valid indexes. This process causes all newly inserted nodes to be comparable by index to all other nodes except those nodes in the same region.

An embodiment includes a method for manipulating dynamic parse tree data and efficiently performing node order comparisons within the parse tree when executed by one or more processors projects a structure of a dynamic parse tree onto a structure of a dynamic height balanced binary tree (HBBT), wherein each node of the dynamic parse tree receives one of either a pointer or an index indicator for storing a value representative of an HBBT node, thereby creating a mapping between nodes in the structure of the dynamic parse tree structure and corresponding nodes in the structure of the HBBT. The method is further executed to associate a new HBBT node with a new DOM node to be inserted into the dynamic parse tree by obtaining one of a predecessor DOM node or successor DOM node of the new DOM node of the dynamic parse tree node, wherein an HBBT node of the predecessor DOM node or the successor DOM node of the new DOM node to be inserted into the dynamic parse tree node is obtained, wherein an HBBT comparison comprises receiving two dynamic parse tree nodes, of $D_X$ and $D_Y$, and obtains respective associated HBBT nodes, X and Y, traverses parent links of HBBT nodes X and Y to find a closest common ancestor node $H_A$ of nodes X and Y, determining when node X equals the closest common ancestor node $H_A$, then $D_X < D_Y$ and when node Y equals the closest common ancestor node $H_A$, then $D_Y < D_X$ and otherwise, obtaining children $H_X$ and $H_Y$ of the closest common ancestor node $H_A$ that are each roots of HBBT sub-trees containing, respectively, X and Y wherein when $H_X$ is a left child of the closest common ancestor node $H_A$, then $D_X < D_Y$, and otherwise $D_Y < D_X$ because $H_Y$ is the left child of the closest common ancestor node $H_A$, wherein $H_X \neq H_Y$ because $H_A$ is the closest common ancestor of X and Y.

The method further executes performing one of a structural tree successor operation or a structural tree predecessor operation, respectively, to obtain an insertion point for the new HBBT node associated with the new DOM node to be inserted into the dynamic parse tree node, wherein when a dynamic parse tree predecessor DOM node is provided, a corresponding HBBT node P is obtained, and a successor insertion point is a corresponding HBBT P.right when it is nil, otherwise a left member of a leftmost node in a corresponding HBBT P.right sub-tree, when P.right is not nil and when the dynamic parse tree successor DOM node is provided, the corresponding HBBT node S is obtained, and a predecessor insertion point is a corresponding HBBT S.left when it is nil, and a right member of a rightmost node in a corresponding HBBT S.left sub-tree, when S.left is not nil.

The method further executes inserting the new HBBT node, associated with the new DOM node, at the insertion point in the HBBT and performing a red-black tree height balancing of the HBBT.

Responsive to a request for a dynamic parse tree DOM node deletion, wherein the dynamic parse tree DOM node to delete is inherently known and the HBBT node associated with the dynamic parse tree DOM node of the request is obtained, the method further executes deleting the HBBT node associated with the dynamic parse tree DOM node and the dynamic parse tree DOM node, performing a red-black tree height balancing of the HBBT.

The height balanced binary tree method and the relaxed node index method and associated respective refinements of the disclosure form independent solutions because each can be used independently of the other to derive most of the benefits of the other. In some cases the height balanced binary tree solution outperforms the relaxed node index method, and in other cases the relaxed node index method is the more efficient solution. Each is independently beneficial, but an overall better solution for some cases comes from using the relaxed node index method and then dependently falling back to the height balanced binary tree solution for comparison of nodes that are newly inserted into the same region of the parse tree.

Embodiments of the disclosure are directed toward optimizing the tree order enforcing aspect of expressions used to navigate a dynamic parse tree as the parse tree undergoes manipulations. Application to XML and XPath in the examples provided should be regarded as a subdomain, and the further use of examples of the XML and XPath within an XML Form, or within mapping code, or within application-specific data population code should be regarded as further subdomains.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for processing parse tree data, the method comprising:
   receiving, by a processor, a parse tree data structure, wherein the parse tree data structure is representative of a document object model (DOM) tree data structure;
   concomitant to receiving the parse tree data structure, receiving, by the processor, an assignment of index values for the DOM nodes consisting of distinct index values for each existing DOM node;
   receiving, by the processor, a request to manipulate the parse tree data structure, wherein the request comprises an insert DOM node request for a new DOM node;
   concomitant to receiving the request to manipulate the parse tree data structure, receiving, by the processor, an indication of a parse tree insert location for the new DOM node to be inserted;
   responsive to receiving the indication of the parse tree insert location:
      assigning a distinguishable index value to the new DOM node to be inserted; and
      inserting the new DOM node at the indicated parse tree insert location;
   receiving, by the processor, a document order comparison request to determine an earlier of a first given DOM node and a second given DOM node;
   responsive to receiving the document order comparison request, determining whether the document order comparison request can be satisfied by a comparison of the index values of the first given DOM node and the second given DOM node;
   responsive to determining that the document order comparison request can be satisfied by a comparison of the index values of the first given DOM node and the second given DOM node, selecting as the earlier DOM node one of the first given DOM node and the second DOM node based on the comparison of the index values of the first given DOM node and the second given DOM node; and
   responsive to a determination that the document order comparison request cannot be satisfied by the comparison of the index values of the first given DOM node and the second given DOM node, selecting as the earlier DOM node one of the first given DOM node and the second DOM node using a secondary comparison method, wherein:
   the distinct index values for each existing DOM node are non-negative integers;

the distinguishable index value assigned to the new DOM node to be inserted is a variable negative integer whose absolute value is one greater than an absolute value of the index value of a pre-order traversal predecessor DOM node of the new DOM node;

the processor determines whether the document order comparison request can be satisfied by a comparison of the index values of the first given DOM node and the second given DOM node by determining that the index values of the first given DOM node and the second given DOM node are not equal; and responsive to a determination that the document order comparison request can be satisfied by a comparison of the index values of the first given DOM node and the second given DOM node, selecting as the earlier DOM node one of the first given DOM node and the second DOM node by:

selecting the given DOM node with the lesser assigned distinct index value when both index values are non-negative;

selecting the given DOM node with the lesser absolute value of assigned distinguishable index value when both index values are negative;

selecting the given DOM node with the lesser absolute value of assigned index value when only one of the index values is negative and its absolute value is not equal to the other index value; and selecting the given DOM node with the distinguishable index value, which is negative, when only one of the index values is negative and its absolute value is equal to the other index value.

2. The method of claim 1 wherein the secondary comparison method is the DOM tree traversal comparison method.

3. The method of claim 1 further comprising:

subsequent to receiving the parse tree data structure, projecting, by the processor, the parse tree data structure received onto a data structure comprising a binary tree, wherein the projecting includes storing a projection that includes an association between each DOM node in a successive pre-order traversal of the parse tree and each binary tree node in a successive in-order traversal of the binary tree thereby creating a map between the parse tree data structure and the binary tree data structure;

subsequent to inserting the new DOM node at the indicated parse tree insert location, the processor:

creates a corresponding binary tree node;

associates the corresponding binary tree node with the new DOM node;

identifies a binary tree insertion point location for the corresponding binary tree node associated with the new DOM node; and inserts the corresponding binary tree node into the binary tree at the identified binary tree insertion point location; and responsive to a determination that the document order comparison request cannot be satisfied by the comparison of the index values of the first given DOM node and the second given DOM node, selecting as the earlier DOM node one of the first given DOM node and the second DOM node using a binary tree document order comparison as the secondary comparison method, wherein the binary tree document order comparison comprises:

obtaining a first corresponding binary tree node associated by the projection with the first given DOM node and a second corresponding binary tree node associated by the projection with the second given DOM node;

determining which of the first corresponding binary tree node and the second corresponding binary tree node is earlier in a traversal order of the binary tree;

selecting a DOM node associated with a determined earlier corresponding binary tree node as the earlier DOM node; and returning an indication of the selected earlier DOM node as the earlier of the first given DOM node and the second given DOM node.

4. The method of claim 3 further comprising:

receiving, by the processor, a request to manipulate the parse tree data structure, wherein the request comprises a delete DOM node request;

deleting from the parse tree data structure the DOM node for which deletion was requested; and deleting from a binary tree structure a corresponding binary tree node associated with the DOM node for which deletion was requested.

5. The method of claim 4 further comprising:

subsequent to receiving the request to manipulate the parse tree data structure, wherein the request comprises one of an insert DOM node or a delete DOM node request, performing a height balancing operation on a binary tree such that the binary tree is a height balanced binary tree (HBBT).

6. The method of claim 1 further comprising:

performing a re-index operation on the assignment of index values for the DOM nodes to assign distinct index values for each existing DOM node.

7. The method of claim 6 further comprising:

subsequent the parse tree data structure, storing an initially empty projection containing no associations of DOM nodes to binary tree nodes, thereby creating an initially empty map between the parse tree data structure and an initially empty binary tree data structure;

responsive to receiving, by the processor, a delete DOM node request, deleting from the binary tree structure a corresponding binary tree node associated with the DOM node for which deletion was requested only when the DOM node has an associated binary tree node;

responsive to receiving, by the processor, an insert DOM node request for a new DOM node, the processor identifies the binary tree insertion point location for the corresponding binary tree node associated with the new DOM node by:

obtaining a pre-order traversal predecessor DOM node, denoted P, of the new DOM node;

responsive to a determination P has an associated binary tree node, identifying a binary tree successor insertion location of the binary tree node associated with P; and responsive to a determination P does not have an associated binary tree node, determining the binary tree insertion point location using a specialized binary tree search using a value of the index of P; and subsequent to performing a re-index operation on the assignment of index values for the DOM nodes to assign distinct index values for each existing DOM node, returning the projection and the binary tree data structure to an empty state.

8. The method of claim 7 wherein a language processor determines whether to automatically perform a re-index operation using a structural change detector, wherein the structural change detector sets a flag that indicates insertion of nodes since a last index assignment occurred.

9. The method of claim 8 wherein the structural change detector flags insertion of non-text nodes, wherein a text node insertion to change a value representative of an empty string to a value representative of non-empty string is regarded as an informational mutation, rather than a structural manipulation of the parse tree data structure.

10. The method of claim 8 wherein the language processor is responsive to an indication, by a language author using an attribute, indicating the requirement to apply, when executing a block of code associated with the attribute, at least one optimization from a set containing at least one of the following: binary tree projection, binary tree projection only on newly inserted nodes, height balancing, relaxed node index method, a variable negative index value assignment, and constant negative index value assignment.

11. A computer program product for processing parse tree data, the computer program product comprising:
    a non-transitory computer readable storage medium having program instructions embodied therewith, the program instructions executable by a processor to cause the processor to perform a method comprising:
    receiving a parse tree data structure, wherein the parse tree data structure is representative of a document object model (DOM) tree data structure;
    concomitant to receiving the parse tree data structure, receiving an assignment of index values for the DOM nodes consisting of distinct index values for each existing DOM node;
    receiving a request to manipulate the parse tree data structure, wherein the request comprises an insert DOM node request for a new DOM node;
    concomitant to receiving the request to manipulate the parse tree data structure, receiving an indication of a parse tree insert location for the new DOM node to be inserted;
    responsive to receiving the indication of the parse tree insert location:
        assigning a distinguishable index value to the new DOM node to be inserted; and
        inserting the new DOM node at the indicated parse tree insert location;
    receiving a document order comparison request to determine an earlier of a first given DOM node and a second given DOM node;
    responsive to receiving the document order comparison request, determining whether the document order comparison request can be satisfied by a comparison of the index values of the first given DOM node and the second given DOM node;
    responsive to determining that the document order comparison request can be satisfied by a comparison of the index values of the first given DOM node and the second given DOM node, selecting as the earlier DOM node one of the first given DOM node and the second DOM node based on the comparison of the index values of the first given DOM node and the second given DOM node; and
    responsive to a determination that the document order comparison request cannot be satisfied by the comparison of the index values of the first given DOM node and the second given DOM node, selecting as the earlier DOM node one of the first given DOM node and the second DOM node using a secondary comparison method, wherein:
        the distinct index values for each existing DOM node are non-negative integers;
        the distinguishable index value assigned to the new DOM node to be inserted is a variable negative integer whose absolute value is one greater than an absolute value of the index value of a pre-order traversal predecessor DOM node of the new DOM node;
        the processor determines whether the document order comparison request can be satisfied by a comparison of the index values of the first given DOM node and the second given DOM node by determining that the index values of the first given DOM node and the second given DOM node are not equal; and
        responsive to a determination that the document order comparison request can be satisfied by a comparison of the index values of the first given DOM node and the second given DOM node, selecting as the earlier DOM node one of the first given DOM node and the second DOM node by:
            selecting the given DOM node with the lesser assigned distinct index value when both index values are non-negative;
            selecting the given DOM node with the lesser absolute value of assigned distinguishable index value when both index values are negative;
            selecting the given DOM node with the lesser absolute value of assigned index value when only one of the index values is negative and its absolute value is not equal to the other index value; and
            selecting the given DOM node with the distinguishable index value, which is negative, when only one of the index values is negative and its absolute value is equal to the other index value.

12. The computer program product of claim 11, wherein the secondary comparison method is the DOM tree traversal comparison method.

13. The computer program product of claim 11, wherein the program instructions are further executable by the processor for:
    subsequent to receiving the parse tree data structure, projecting the parse tree data structure received onto a data structure comprising a binary tree, wherein the projecting stores a projection that includes an association between each DOM node in a successive pre-order traversal of the parse tree and each binary tree node in a successive in-order traversal of the binary tree thereby creating a map between the parse tree data structure and the binary tree data structure;
    subsequent to inserting the new DOM node at the indicated parse tree insert location, the processor:
        creates a corresponding binary tree node;
        associates the corresponding binary tree node with the new DOM node;
        identifies a binary tree insertion point location for the corresponding binary tree node associated with the new DOM node; and
        inserts the corresponding binary tree node into the binary tree at the identified binary tree insertion point location; and
    responsive to a determination that the document order comparison request cannot be satisfied by the comparison of the index values of the first given DOM node and the second given DOM node, selecting as the earlier DOM node one of the first given DOM node and the second DOM node using a binary tree document order comparison as the secondary comparison method, wherein the binary tree document order comparison comprises:

obtaining a first corresponding binary tree node associated by the projection with the first given DOM node and a second corresponding binary tree node associated by the projection with the second given DOM node;

determining which of the first corresponding binary tree node and the second corresponding binary tree node is earlier in a traversal order of the binary tree;

selecting a DOM node associated with a determined earlier corresponding binary tree node as the earlier DOM node; and returning an indication of the selected earlier DOM node as the earlier of the first given DOM node and the second given DOM node.

14. The computer program product of claim 13, the program instructions are further executable by the processor for:

receiving a request to manipulate the parse tree data structure, wherein the request comprises a delete DOM node request;

deleting from the parse tree data structure the DOM node for which deletion was requested; and deleting from a binary tree structure a corresponding binary tree node associated with the DOM node for which deletion was requested.

15. The computer program product of claim 14, the program instructions are further executable by the processor for:

subsequent to receiving a request to manipulate the parse tree data structure, wherein the request comprises one of an insert DOM node or a delete DOM node request, performing a height balancing operation on a binary tree such that the binary tree is a height balanced binary tree (HBBT).

16. An apparatus for processing parse tree data, the apparatus comprising:

a memory having computer readable instructions; and a processor configured to execute the computer readable instructions, the instructions comprising:

receiving, a parse tree data structure, wherein the parse tree data structure is representative of a document object model (DOM) tree data structure;

concomitant to receiving the parse tree data structure, receiving an assignment of index values for the DOM nodes consisting of distinct index values for each existing DOM node;

receiving a request to manipulate the parse tree data structure, wherein the request comprises an insert DOM node request for a new DOM node;

concomitant to receiving the request to manipulate the parse tree data structure, receiving an indication of a parse tree insert location for the new DOM node to be inserted;

responsive to receiving the indication of the parse tree insert location:

assigning a distinguishable index value to the new DOM node to be inserted; and inserting the new DOM node at the indicated parse tree insert location;

receiving a document order comparison request to determine an earlier of a first given DOM node and a second given DOM node;

responsive to receiving the document order comparison request, determining whether the document order comparison request can be satisfied by a comparison of the index values of the first given DOM node and the second given DOM node;

responsive to determining that the document order comparison request can be satisfied by a comparison of the index values of the first given DOM node and the second given DOM node, selecting as the earlier DOM node one of the first given DOM node and the second DOM node based on the comparison of the index values of the first given DOM node and the second given DOM node; and responsive to a determination that the document order comparison request cannot be satisfied by the comparison of the index values of the first given DOM node and the second given DOM node, selecting as the earlier DOM node one of the first given DOM node and the second DOM node using a secondary comparison method, wherein:

the distinct index values for each existing DOM node are non-negative integers;

the distinguishable index value assigned to the new DOM node to be inserted is a variable negative integer whose absolute value is one greater than an absolute value of the index value of a pre-order traversal predecessor DOM node of the new DOM node;

the processor determines whether the document order comparison request can be satisfied by a comparison of the index values of the first given DOM node and the second given DOM node by determining that the index values of the first given DOM node and the second given DOM node are not equal; and responsive to a determination that the document order comparison request can be satisfied by a comparison of the index values of the first given DOM node and the second given DOM node, selecting as the earlier DOM node one of the first given DOM node and the second DOM node by:

selecting the given DOM node with the lesser assigned distinct index value when both index values are non-negative;

selecting the given DOM node with the lesser absolute value of assigned distinguishable index value when both index values are negative;

selecting the given DOM node with the lesser absolute value of assigned index value when only one of the index values is negative and its absolute value is not equal to the other index value; and selecting the given DOM node with the distinguishable index value, which is negative, when only one of the index values is negative and its absolute value is equal to the other index value.

* * * * *